US008659573B2

(12) United States Patent
Haga et al.

(10) Patent No.: US 8,659,573 B2
(45) Date of Patent: *Feb. 25, 2014

(54) DISPLAY AND METHOD FOR DRIVING THE DISPLAY

(71) Applicant: NLT Technologies, Ltd., Kanagawa (JP)

(72) Inventors: Hiroshi Haga, Kanagawa (JP); Jiro Yanase, Kanagawa (JP); Yoichi Kitagishi, Kanagawa (JP)

(73) Assignee: NLT Technologies, Ltd., Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/897,629

(22) Filed: May 20, 2013

(65) Prior Publication Data

US 2013/0285986 A1    Oct. 31, 2013

Related U.S. Application Data

(62) Division of application No. 12/504,218, filed on Jul. 16, 2009, now Pat. No. 8,477,105.

(30) Foreign Application Priority Data

Jul. 17, 2008  (JP) ................................. 2008-186255
Jun. 4, 2009   (JP) ................................. 2009-135211
Jul. 10, 2009  (JP) ................................. 2009-163401

(51) Int. Cl.
    *G06F 3/041*    (2006.01)

(52) U.S. Cl.
    USPC ........ 345/173; 345/104; 345/174; 178/18.01; 178/18.03; 178/18.05; 178/18.06

(58) Field of Classification Search
    USPC ............ 345/173, 174, 104; 178/18.01, 18.03, 178/18.05, 18.06
    See application file for complete search history.

(56) References Cited

U.S. PATENT DOCUMENTS 4,293,734 A    10/1981  Pepper, Jr.
5,357,266 A    10/1994  Tagawa
(Continued)

FOREIGN PATENT DOCUMENTS

JP    56-500230 A    2/1981
JP      8146381 A    6/1996
(Continued)

OTHER PUBLICATIONS

Japanese Office Action issued Mar. 5, 2013 in corresponding Japanese Patent Application No. 2009-163401.

*Primary Examiner* — Lun-Yi Lao
*Assistant Examiner* — Kelly B Hegarty
(74) *Attorney, Agent, or Firm* — Sughrue Mion, PLLC

(57) ABSTRACT

A display is provided. The display includes electro-optical material arranged between first and second planes facing each other; a first substrate arranged on the first plane and including a conductor; first electrically conductive film arranged on the second plane; second electrically conductive film arranged outside an area sandwiched between the first and second planes; current detection circuit detects current on the second electrically conductive film; and control circuit that, during a time period the current is detected by the current detection circuit, applies substantially the same voltage as that applied to the second electrically conductive film to one of the conductor and the first electrically conductive film, which is arranged closer to the second electrically conductive film, and sets the other in a floating state, or applies substantially the same voltage as that applied to the second electrically conductive film to both the conductor and the first electrically conductive film.

4 Claims, 29 Drawing Sheets

(56) References Cited

U.S. PATENT DOCUMENTS

| | | |
|---|---|---|
| 5,448,024 A | 9/1995 | Kawaguchi et al. |
| 5,642,134 A | 6/1997 | Ikeda |
| 5,825,345 A | 10/1998 | Takahama et al. |
| 5,844,175 A | 12/1998 | Nakanishi et al. |
| 5,886,687 A | 3/1999 | Gibson |
| 5,995,172 A | 11/1999 | Ikeda et al. |
| 6,057,903 A | 5/2000 | Colgan et al. |
| 6,239,389 B1 | 5/2001 | Allen et al. |
| 6,239,788 B1 | 5/2001 | Nohno et al. |
| 6,259,490 B1 | 7/2001 | Colgan et al. |
| 7,633,484 B2 | 12/2009 | Ito |
| 7,843,439 B2 | 11/2010 | Perski et al. |
| 7,880,733 B2 | 2/2011 | Abileah et al. |
| 8,013,943 B2 | 9/2011 | Tanaka et al. |
| 8,031,180 B2 | 10/2011 | Miyamoto et al. |
| 8,077,161 B2 | 12/2011 | Kinoshita |
| 8,319,737 B2 | 11/2012 | Noguchi et al. |
| 8,355,006 B2 | 1/2013 | Park et al. |
| 2004/0105040 A1 | 6/2004 | Oh et al. |
| 2004/0217945 A1 | 11/2004 | Miyamoto et al. |
| 2005/0168450 A1 | 8/2005 | Ito |
| 2005/0184971 A1 | 8/2005 | Ogino et al. |
| 2006/0214918 A1 | 9/2006 | Destura et al. |
| 2008/0062140 A1 | 3/2008 | Hotelling et al. |
| 2009/0040192 A1 | 2/2009 | Haga |
| 2009/0046077 A1 | 2/2009 | Tanaka et al. |
| 2010/0001973 A1 | 1/2010 | Hotelling et al. |
| 2010/0020040 A1 | 1/2010 | Han |
| 2010/0090975 A1 | 4/2010 | Nagata et al. |
| 2010/0110035 A1 | 5/2010 | Selker |
| 2010/0193257 A1 | 8/2010 | Hotelling et al. |
| 2010/0194699 A1 | 8/2010 | Chang |
| 2010/0253638 A1 | 10/2010 | Yousefpor et al. |
| 2010/0259503 A1 | 10/2010 | Yanase et al. |
| 2011/0267295 A1 | 11/2011 | Noguchi et al. |
| 2011/0310059 A1 | 12/2011 | Miyamoto et al. |
| 2012/0050193 A1 | 3/2012 | Noguchi et al. |

FOREIGN PATENT DOCUMENTS

| | | |
|---|---|---|
| JP | 2000-081610 A | 3/2000 |
| JP | 2000-105670 A | 4/2000 |
| JP | 2003-066417 A | 3/2003 |
| JP | 2007-240830 A | 9/2007 |
| JP | 2007-334606 A | 12/2007 |
| WO | 2007/102238 A1 | 9/2007 |

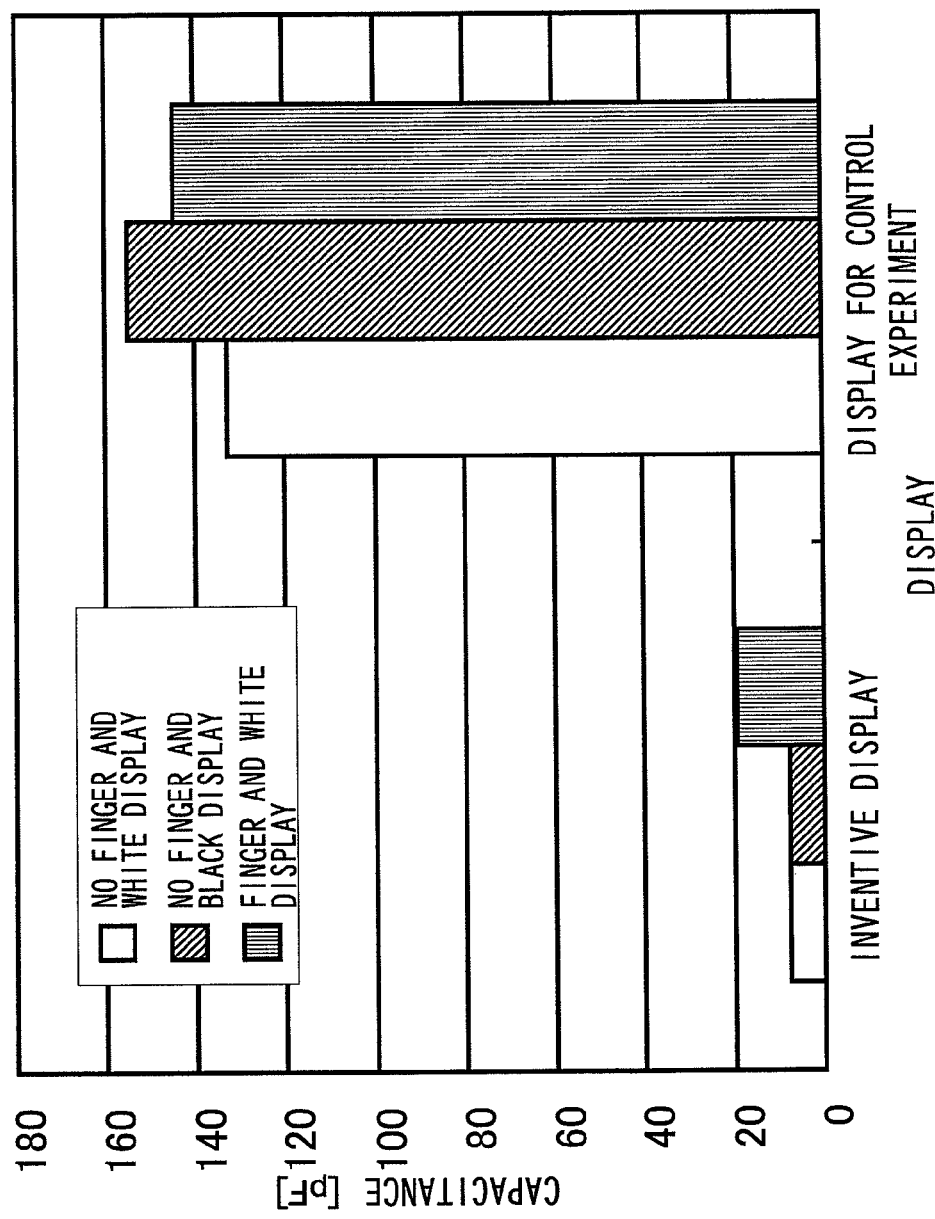

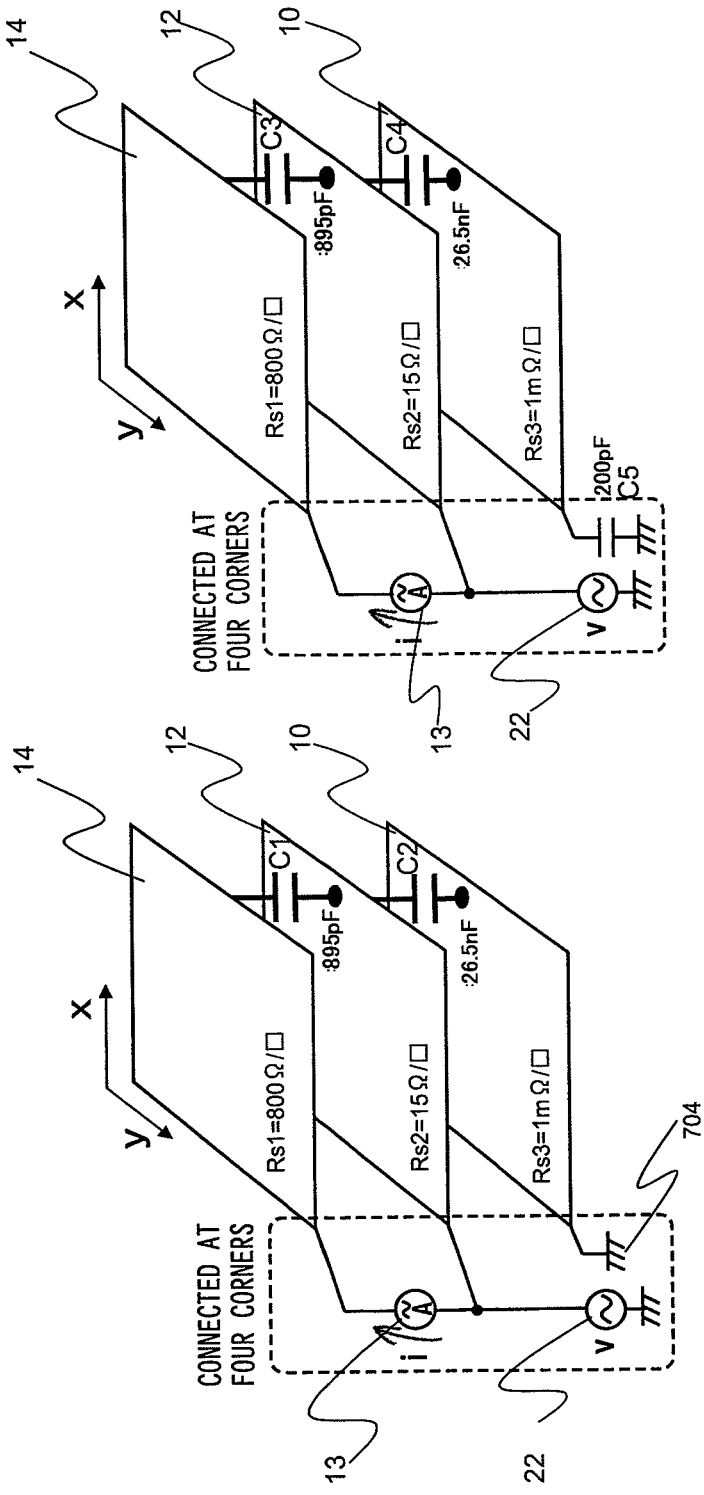

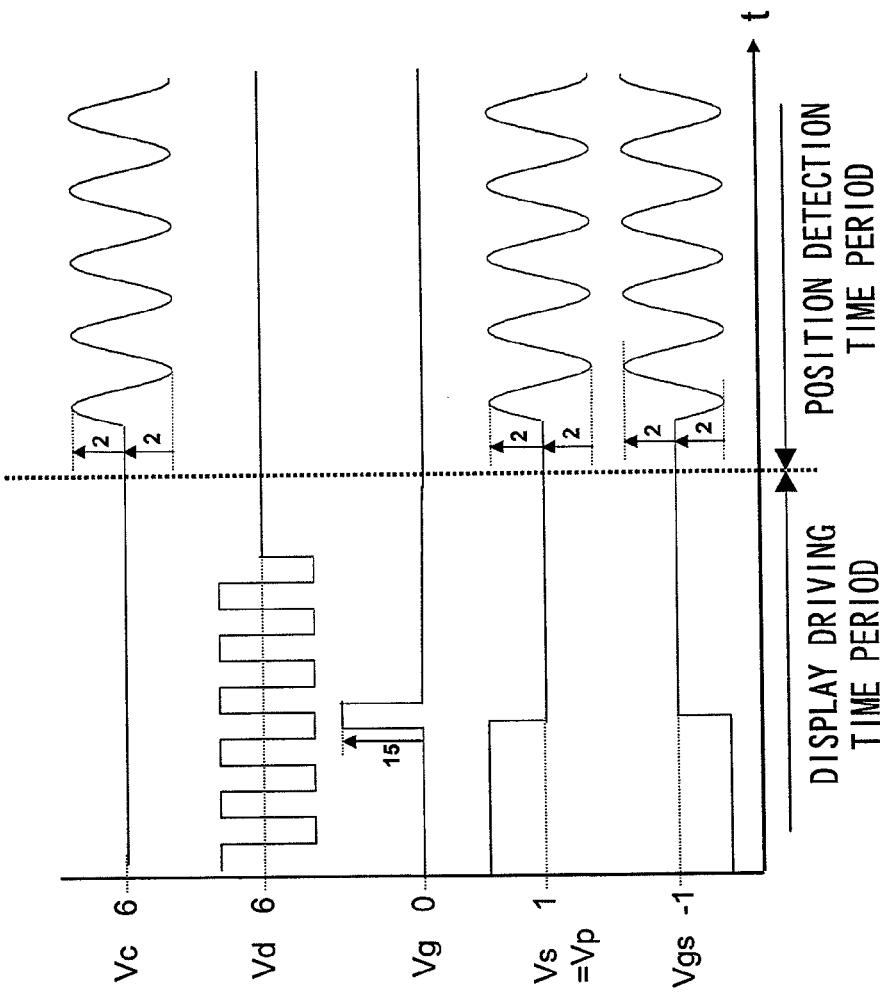

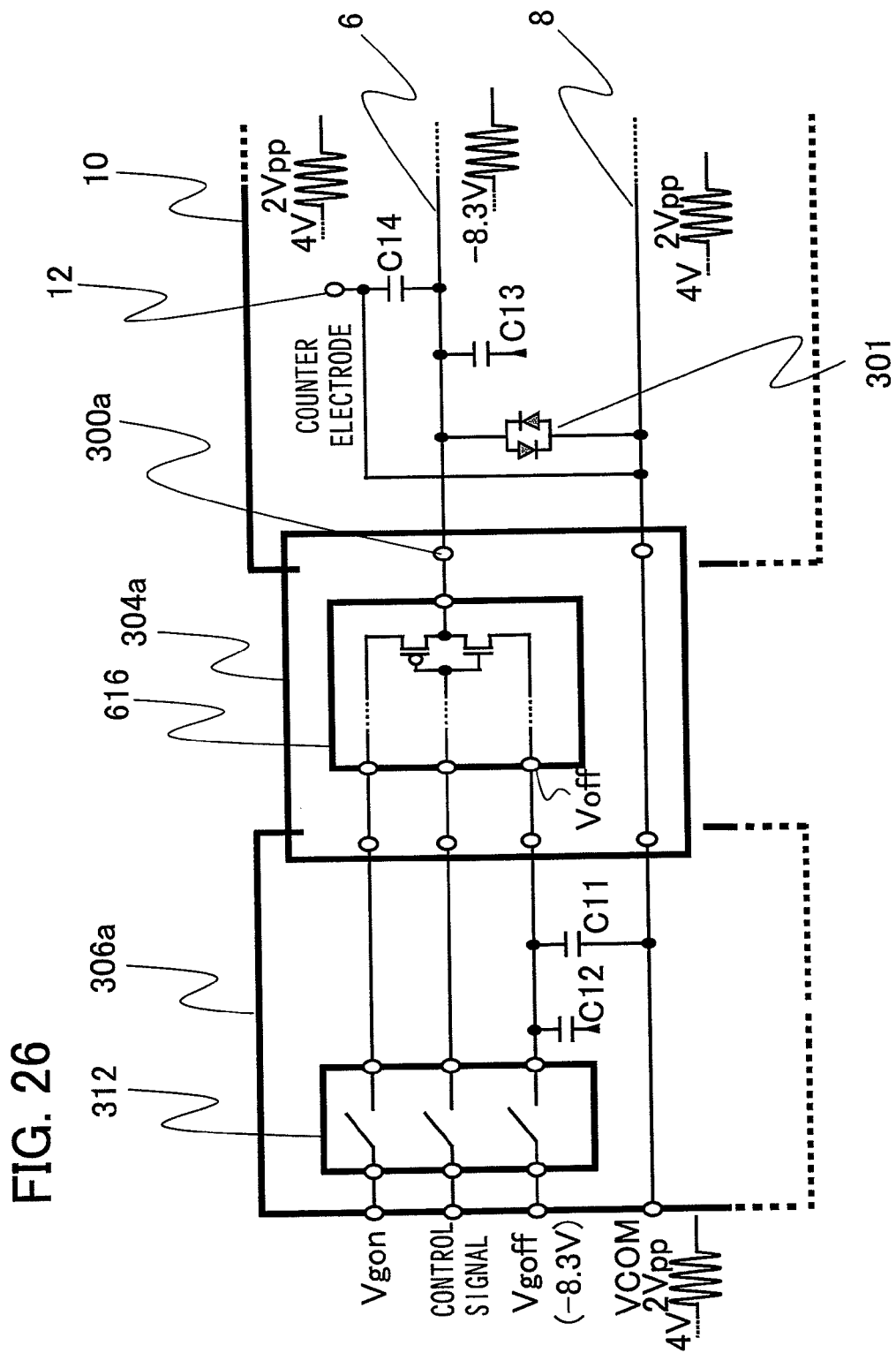

C11 CONNECTED TO VCOM

NO C11

C11 CONNECTED TO GROUND

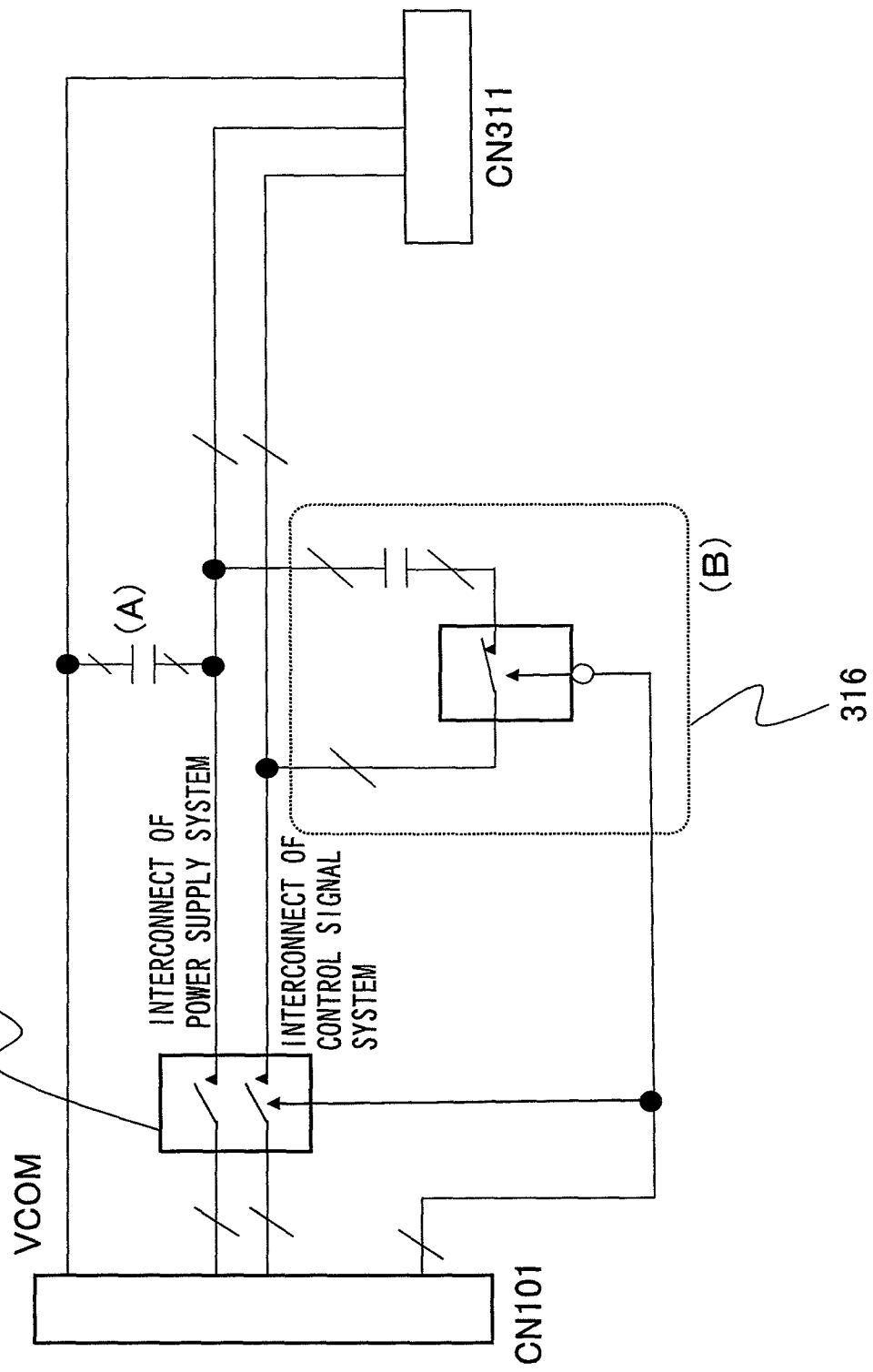

DISPLAY AND METHOD FOR DRIVING THE DISPLAY

REFERENCE TO RELATED APPLICATION

This application is a Divisional of U.S. patent application Ser. No. 12/504,218, filed on Jul. 16, 2009, which claims priority from Japanese patent applications No. 2008-186255, filed on Jul. 17, 2008, No. 2009-135211, filed on Jun. 4, 2009, and No. 2009-163401, filed on Jul. 10, 2009, the contents of all of which are incorporated herein by reference in their entirety.

TECHNICAL FIELD

This invention relates to a display apparatus (termed herein simply as "display") and a method for driving the display. More particularly, it relates to a display that detects position coordinates pointed by a finger or a pen on a display surface, or the pointing motion, and to a method for driving the display.

BACKGROUND

A touch sensor is a device for detecting position coordinates pointed by a finger or a pen, or occurrence or nonoccurrence of the pointing motion. At present, the touch sensor is routinely used in combination with a display such as a liquid crystal display (LCD) or a plasma display panel (PDP).

It will be appreciated that a user friendly man-machine interface may be realized by entering an output of the touch sensor to a computer, controlling display contents on the display or controlling a peripheral using a computer. Nowadays, the touch sensor is used extensively in our everyday life, such as in game machines, mobile information terminals, ticket vending machines, automatic telling machines (ATM) or car navigation systems. Moreover, with higher performance of computers and with coming into widespread use of networking environments, variegated services are offered by electronic appliances. Hence, there are expanding needs for the display provided with touch sensors.

As touch sensor systems, there are currently known a capacitive system, a resistive system, an infrared (IR) system, a surface acoustic wave (SAW) system or an electro-magnetic resonance system. The capacitive system is subdivided into a projected capacitive type and a surface capacitive type.

The surface capacitive type touch sensor includes a transparent substrate, a uniform transparent electrically conductive film, formed on its surface, and a thin insulating film formed on an upper surface of the electrically conductive film. The transparent electrically conductive film is termed an electrically conductive position detection film. In driving the touch sensor, an ac voltage is applied to each of the four corners of the electrically conductive position detection film. When the finger has touched the electrically conductive position detection film, a minor current will flow through the finger via a capacitor formed between the electrically conductive position detection film and the finger. This current flows from each of the respective corners to the touched point. A signal processing circuit detects whether or not touch has been made based on the sum of the currents, while calculating the coordinates of the touched position based on the ratio of the currents. Patent Document 1 discloses a basic apparatus in connection with the technique of the surface capacitive type touch sensor. Patent Document 2 shows pertinent known examples in connection with this technique.

The conventional practice has been to use the surface capacitive type touch sensor, having a transparent substrate as one of constituent elements, as the sensor is superposed on a display. In such case, there is raised a problem that the display is increased in thickness or weight, due to the thickness of the touch sensor itself, or the quality of demonstration is lowered due to the presence of a component overlying the display surface. Patent Document 3, for example, discloses a technique that addresses this problem. Specifically, Patent Document 3 discloses a liquid crystal display in which a surface capacitive position detection electrically conductive film is unified to a front or back surface of a color filter substrate. It has been felt to be desirable to provide the position detection electrically conductive film on a side more proximate to a polarization plate than to an ITO (Indium Tin Oxide) film, as a common electrode, in consideration of electrical effects, that is, noise, as will be described subsequently. By this formulation, a transparent substrate, so far needed apart from the liquid crystal display, may be dispensed with to enable reduction in weight and thickness as well as to prevent picture quality deterioration.

In Patent Document 3, the following description is made in connection with the noise shielding effect. The surface capacitive type touch sensor is inherently susceptible to noise. A liquid crystal display is susceptible to noise because of variations in the potential of the pixel electrode. However, with the liquid crystal display, the potential of the common electrode is fixed or inverted at a stated interval for driving the electrode. It is thus possible to use the common electrode (ITO film) disposed between the electrically conductive position detection film and a TFT array as a noise shield. That is, Patent Document 3 states that the common electrode that is provided between the electrically conductive position detection film and the pixel electrode and that is connected to a fixed potential, performs the role of a noise shield.

Patent Document 4 points out that, in a structure where the electrically conductive position detection film is unified to a color filter substrate, the capacitive coupling between the electrically conductive position detection film and the common electrode is much stronger than capacitive coupling between the electrically conductive position detection film and the human (effective capacitance), which should pose a problem. Patent Document 4 proposes a structure and a driving method that address this problem. In a structure proposed, an electrically conductive position detection film is unified on a first substrate to a protective plane layer, which protective plane layer is arranged between the electrically conductive position detection film and the common electrode. That is, there is disclosed a structure in which the protective plane layer is newly provided between the electrically conductive position detection film and the common electrode. In a driving method, a signal obtained on amplitude scaling or phase shifting a signal of the electrically conductive position detection film is delivered to the protective plane layer. This should lower the capacitive coupling between the electrically conductive position detection film and the common electrode.

Patent Document 5 discloses a setup including a liquid crystal display circuit, a position detection circuit, and a switching circuit. The liquid crystal display circuit delivers the voltage or the current for demonstration to a transparent counter electrode, and the position detection circuit detects currents flowing from a plurality of positions on the transparent counter electrode. The switching circuit provides for electrical connection of the liquid crystal display circuit or the position detection circuit to the transparent common electrode. Patent Document 5 states that the problem of deterioration of display quality may be overcome by temporally isolating a case where the transparent common electrode is used as a common electrode for display and a case where it is used as an electrically conductive position detection film and by alternately switching one of the two cases to the other and vice versa.

Patent Document 6 teaches a driving device for a display including a touch panel provided with an electrically conductive film. The driving device for the display includes a counter electrode driving means. During the non-displaying time such as during the vertical blanking period, the counter electrode driving means applies the same signal as that applied to the transparent common electrode of the touch panel to the counter electrode. Since the potential at the counter electrode is the same as that at the transparent electrically conductive film on the touch panel, the induced voltage at the touch panel, ascribable to the potential difference between the counter electrode and the transparent electrically conductive film, may be reduced to a level that does not affect position detection accuracy.

RELATED TECHNICAL PUBLICATIONS

Patent Documents
[Patent Document 1]
U.S. Pat. No. 4,293,734
[Patent Document 2]
JP Patent Kohyo Publication No. JP-A-56-500230
[Patent Document 3]
JP Patent Kokai Publication No. JP-P2000-081610A
[Patent Document 4]
JP Patent Kokai Publication No. JP-P2000-105670A
[Patent Document 5]
JP Patent Kokai Publication No. JP-P2003-066417A
[Patent Document 6]
JP Patent Kokai Publication No. JP-P2007-334606A

SUMMARY

The following analysis is made by the present inventor. The entire disclosure of the above referenced Patent Documents are incorporated herein by reference thereto. The displays disclosed in Patent Documents 1 to 6 are beset with the following problems:

A first problem is that parasitic capacitance of the electrically conductive position detection film is still much larger than the static capacitance between the human finger and the electrically conductive position detection film. Patent Document 4 addresses this problem that may arise with the Patent Documents 1 to 3 by lowering the capacitive coupling between the electrically conductive position detection film and the common electrode by taking advantage of the newly provided protective plane layer. With Patent Document 6, the same signal as that applied to the transparent electrically conductive film of the touch panel is applied to the counter electrode. It may thus be inferred from Patent Document 4 that, by so doing, the parasitic capacitance may be decreased. However, even with the technique of Patent Document 6, there persists the problem that the position coordinates cannot be detected, or the signal processing circuit tends to be expensive, because of the large parasitic capacitance, as will be discussed in detail later on.

A second problem is that variations of the parasitic capacitance of the electrically conductive position detection film are larger than the static capacitance between the human finger and the electrically conductive position detection film. In particular, the variations accompanying display contents of the display may raise a problem. This problem is ascribable to dielectric constant anisotropy of liquid crystal molecules, and arises by the fact that display contents cause the alignment to be changed such as to act either directly or indirectly on the parasitic capacitance of the electrically conductive position detection film. As a result, there is presented a problem that the signal processing circuit becomes unable to detect whether or not the finger touch has been made. In short, the signal processing circuit is unable to distinguish between a signal change caused by a finger touch and that caused by changes in display contents.

A third problem is that a pixel switch cannot be kept in an off-state so that leakage current may be generated to deteriorate the display performance. In Patent Document 5, an ac voltage of 2 to 3 volt is applied to the counter electrode during the position detection time. Since the pixel electrode is at high impedance and is coupled with the counter electrode with strong capacitive coupling, the pixel electrode is similarly varied in a range of 2 to 3 volts. Hence, the gate source voltage (Vgs) of a thin-film transistor (TFT) as a pixel switch may be varied, with the result that the pixel switch may be turned on intermittently, as will be set forth later on in detail with reference to FIG. 13.

It is therefore an object of the present invention to provide a display having a touch sensor capable of accurately detecting a finger touch or a touch position, and a method for driving the display.

In a first aspect, the present invention provides a display comprising: an electro-optical material arranged between first and second planes facing each other; a first substrate arranged on the first plane and including a conductor that affords an electrical signal to the electro-optical material; a first electrically conductive film arranged on the second plane to afford an electrical signal to the electro-optical material; a second electrically conductive film arranged outside an area sandwiched between the first and second planes; a current detection circuit that detects the current on the second electrically conductive film; and a control circuit. During a time period the current is detected by the current detection circuit, the control circuit affords substantially the same voltage as that applied to the second electrically conductive film to one of the conductor and the first electrically conductive film which is arranged more proximate to the second electrically conductive film, and sets the other in a floating state. Or, control circuit applies substantially the same voltage as that applied to the second electrically conductive film to both the conductor and the first electrically conductive film.

With the display according to a first exemplary mode, the electro-optical material preferably is liquid crystal, an electrophoretic material, charged particles, an electrochromic material, an EL material, a gas, a semiconductor, or a phosphorescent material.

The display according to a second exemplary mode may further comprise an ac voltage source that applies ac voltage to the second electrically conductive film. The current detection circuit may detect the current between the ac voltage source and the second electrically conductive film.

With the display according to a third exemplary mode, the electro-optical material may be composed mainly of liquid crystal, and the first electrically conductive film is transparent. The second electrically conductive film may be transparent and arranged on the same side of an area delimited by the first and second planes as the first electrically conductive film. The display may be further comprise a second substrate sandwiched between the first and second electrically conductive films. During a time period the current detection circuit detects the current, the control circuit may set a part of the conductor extending from inside to outside of a viewing area to a floating state and may apply substantially the same voltage as that applied to the second electrically conductive film to the first electrically conductive film. Or, the control circuit may apply substantially the same voltage as that applied to the second electrically conductive film to both the conductor part and the first electrically conductive film.

With the display according to a fourth exemplary mode, the conductor may include a storage capacitance line extending from inside to outside of the viewing area. During the time period the current detection circuit may detect the current, the control circuit sets the storage capacitance line to a floating state and applies substantially the same voltage as that applied to the second electrically conductive film to the first electrically conductive film. Or, the control circuit may apply substantially the same voltage as that applied to the second electrically conductive film to both the storage capacitance line and the first electrically conductive film.

With the display according to a fifth exemplary mode, the conductor may include a scanning line that extends from inside to outside of the viewing area and that is connected via a switch device to a scanning line driving circuit which drives the scanning line. Or the scanning line driving circuit may output three values of a high level, a low level and a high impedance, and may be directly connected to the scanning line.

With the display according to a sixth exemplary mode, the electro-optical material may be composed mainly of liquid crystal. The first and second electrically conductive films may be transparent, and the second electrically conductive film may be arranged on the same side of an area delimited by the first and second planes as the first electrically conductive film. The display may further comprise a second substrate carrying thereon the first electrically conductive film, and a third substrate carrying thereon the second electrically conductive film. During the time period the current detection circuit detects the current, the control circuit may set a part of the conductor extending from inside to outside of a viewing area to a floating state and applies substantially the same voltage as that applied to the second electrically conductive film to the first electrically conductive film. Or, the control circuit may apply substantially the same voltage as that applied to the second electrically conductive film to both the conductor part and the first electrically conductive film.

With the display according to a seventh exemplary mode, the electro-optical material may be composed mainly of liquid crystal, and the first electrically conductive film may be opaque and have an opening. The second electrically conductive film may be transparent and arranged on the same side of an area sandwiched between the first and second planes as the first electrically conductive film. The display may further comprise a second substrate sandwiched between the first and second electrically conductive films. During the time period the current detection circuit detects the current, the control circuit may set a part of the conductor extending from inside to outside of a viewing area to a floating state and may apply substantially the same voltage as that applied to the second electrically conductive film to the first electrically conductive film. Or, the control circuit may apply substantially the same voltage as that applied to the second electrically conductive film to both the conductor part and the first electrically conductive film.

In a second aspect, the present invention provides a display comprising: an electro-optical material; a conductor that affords an electrical signal to the electro-optical material; a first electrically conductive film that affords an electrical signal to the electro-optical material; a second electrically conductive film provided on a viewing area of the display; a current detection circuit that detects the current on the second electrically conductive film; and a control circuit. During a time period the current is detected by the current detection circuit, the control circuit affords substantially the same voltage as that applied to the second electrically conductive film to one of the conductor and the first electrically conductive film, and sets the other in a floating state. Or, the control circuit applies substantially the same voltage as that applied to the second electrically conductive film to both the conductor and the first electrically conductive film.

An electronic apparatus according to an eighth exemplary mode preferably comprises a display as defined above.

In a third aspect, the present invention provides a driving method for a display. The display comprises an electro-optical material arranged between first and second planes facing each other, a first substrate arranged on the first plane and including a conductor that affords an electrical signal to the electro-optical material, a first electrically conductive film arranged on the second plane to afford an electrical signal to the electro-optical material, and a second electrically conductive film arranged outside an area sandwiched between the first and second planes. The driving method comprises: detecting the current on the second electrically conductive film by a current detection circuit. The driving method also comprises: applying, during a time period the current is detected by the current detection circuit, substantially the same voltage as that applied to the second electrically conductive film to one of the conductor and the first electrically conductive film which is arranged more proximate to the second electrically conductive film, and setting the other in a floating state, or applying substantially the same voltage as that applied to the second electrically conductive film to both the conductor and the first electrically conductive film.

The meritorious effects of the present invention are summarized as follows.

As a first meritorious effect of the present invention, the parasitic capacitance (or a signal detected as parasitic capacitance) of the position detection electrically conductive film (second electrically conductive film) is drastically decreased. Also, as a second meritorious effect, variations in the static capacitance resulting from display contents of the display may be reduced in comparison with the static capacitance between the human finger and the position detection electrically conductive film. Thus, according to the present invention, there are provided a display having a touch sensor capable of accurately detecting whether or not touch has been made or the touch position, and a method for driving the display.

The following may account for the first and second meritorious effects derived from the present invention. The first electrically conductive film of the related art has strong capacitive bonding with respect to a substrate (first substrate) of the display. If the conductors, such as interconnects, formed on the display substrate, are set in the floating state, or the same voltage as that applied to the first electrically conductive film is applied to these conductors, the static capacitance of the display substrate as seen from the first electrically conductive film is decreased. The reason is that substantially the same voltage as that applied to the second electrically conductive film (position detection electrically conductive film) may be applied to the first electrically conductive film in its entirety. As a result, the first electrically conductive film operates as an ideal shielding layer with respect to the second electrically conductive film. It is thus possible to reduce variations in the static capacitance of the display substrate, as seen from the first electrically conductive film, otherwise caused by variations in the dielectric constant of a dielectric material arranged between the first electrically conductive film and the display substrate.

A third meritorious effect is that an off-state of a switching device of the display substrate may be maintained to prevent deterioration of the display characteristic. The reason is that, since the amplitude of the voltage at principal conductors in the pixel circuit is varied with that at the first electrically conductive film, the gate-to-source voltage Vgs of the switching device, such as switch TFT, is maintained at the voltage that prevailed at the close of the display time period. This will be explained in detail throughout the following description of preferred exemplary embodiments of the present invention.

BRIEF DESCRIPTION OF THE DRAWINGS

FIG. 10 is a graph showing the results of the control experiment for comparison with the display according to the exemplary embodiment 2 of the present invention.

FIGS. 11A and 11B are schematic views showing a model for analyzing the results of the control experiment for comparison with the display according to the exemplary embodiment 2 of the present invention.

FIG. 13 is a graph showing an example timing chart of the voltage at interconnects in a conventional display.

FIG. 26 is a circuit diagram for illustrating the design concept of a V-connection board in the display according to the exemplary embodiment 3 bis of the present invention.

FIG. 28 is a block circuit diagram of the V-connection board in the display according to the exemplary embodiment 3 bis of the present invention.

PREFERRED MODES

Preferred exemplary embodiments of the present invention will now be described in detail.

Exemplary Embodiment 1

Figure 1:
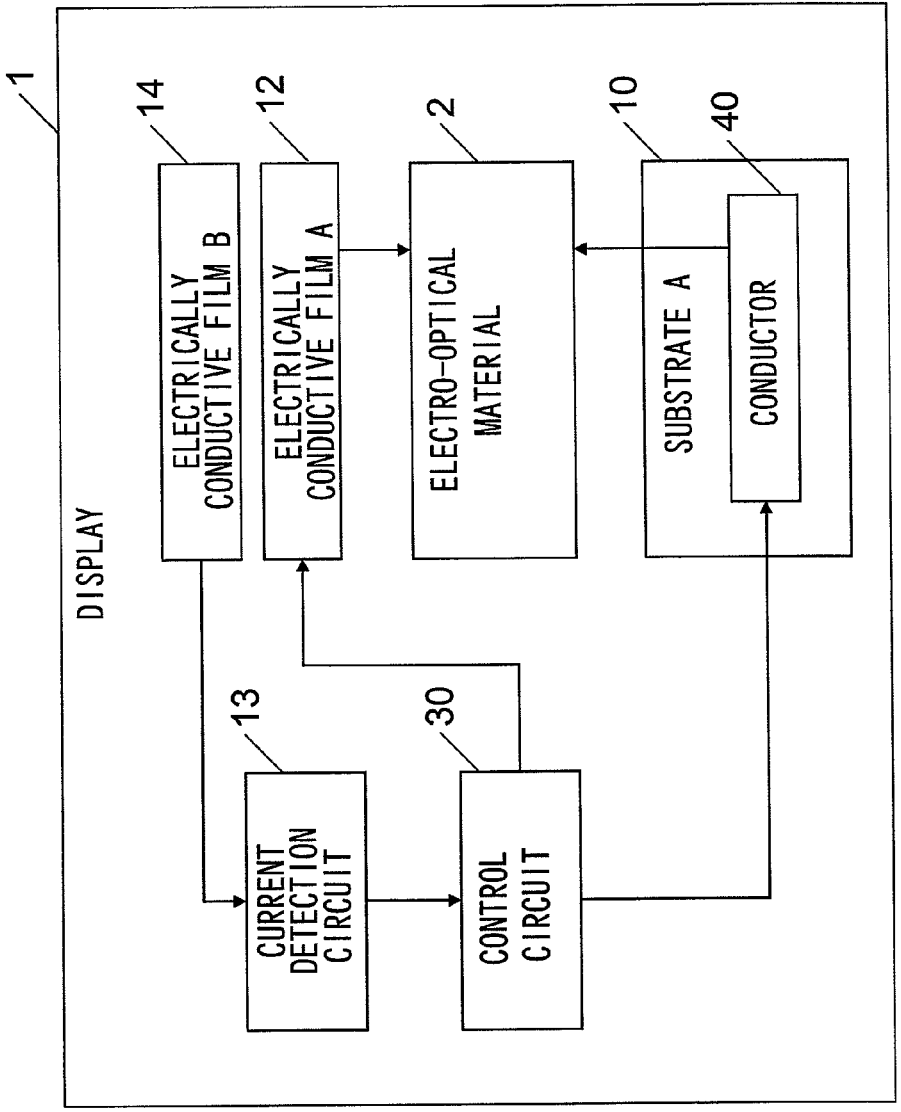
FIG. 1 is a block diagram showing the formulation of a display according to exemplary embodiment 1 of the present invention.

FIG. 1 depicts a block diagram showing a formulation of a display 1 according to exemplary embodiment 1 of the present invention. Referring to FIG. 1, the display includes an electro-optical material 2, a conductor 40, an electrically conductive film A 12, an electrically conductive film B 14, a current detection circuit 13 and a control circuit 30.

The conductor 40 affords an electrical signal to the electro-optical material 2. The electrically conductive film A 12 affords an electrical signal to the electro-optical material 2. The electrically conductive film B 14 is provided on a display surface of the display 1. The current detection circuit 13 detects the current on the electrically conductive film B 14. During the time the current is detected by the current detection circuit 13, the control circuit 30 applies substantially the same voltage as that applied to the electrically conductive film B 14 to one of the conductor 40 and the electrically conductive film A 12, while setting the other of the conductor 40 and the electrically conductive film A 12 to a floating state. Or, the control circuit applies substantially the same voltage as that applied to the electrically conductive film B 14 to both of the conductor 40 and the electrically conductive film A 12.

The display 1 preferably includes an electro-optical material 2, a substrate A 10, an electrically conductive film A 12, an electrically conductive film B 14, a current detection circuit 13 and a control circuit 30.

The electro-optical material 2 is arranged between first and second planes facing each other. The substrate A 10 is arranged on the first plane and includes a conductor 40 that affords an electrical signal to the electro-optical material 2. The electrically conductive film A 12 is arranged on the second plane and affords an electrical signal to the electro-optical material 2. The electrically conductive film B 14 is arranged outside of an area delimited between the first and second planes. The current detection circuit 13 detects the current on the electrically conductive film B 14. During a time period the current is detected by the current detection circuit 13, the control circuit 30 applies substantially the same voltage as that applied to the electrically conductive film B 14 to one of the conductor 40 and the electrically conductive film A 12 that is more proximate to the electrically conductive film B 14, while setting the other to a floating state. Alternatively, the control circuit 13 applies substantially the same voltage as that applied to the electrically conductive film B 14 to both of the conductor 40 and the electrically conductive film A 12.

In addition, the following method is provided as a method for driving the display 1 according to the present exemplary embodiment. That is, the method for driving the display 1 is a driving method for the display 1 including an electro-optical material 2, a substrate A 10, an electrically conductive film A 12 and an electrically conductive film B 14. The electro-optical material 2 is arranged between first and second planes facing each other. The substrate A 10 is arranged on the first plane and affords an electrical signal to the electro-optical material 2. The electrically conductive film A 12 is arranged on the second plane and affords an electrical signal to the electro-optical material 2. The electrically conductive film B 14 is arranged on an outer side of the area delimited between the first and second planes. The method for driving the display 1 preferably includes: detecting the current at the electrically conductive film B 14 by the current detection circuit 13, and applying substantially the same voltage as that applied to the electrically conductive film B 14 to one of the conductor 40 and the electrically conductive film A 12 that is more proximate to the electrically conductive film B 14, during the time period of current detection by the current detection circuit 13, while setting the other of the conductor 40 and the electrically conductive film A 12 to a floating state; or applying the substantially same voltage as that applied to the electrically conductive film B 14 to both the conductor 40 and the electrically conductive film A 12.

Exemplary Embodiment 2

Figure 2:
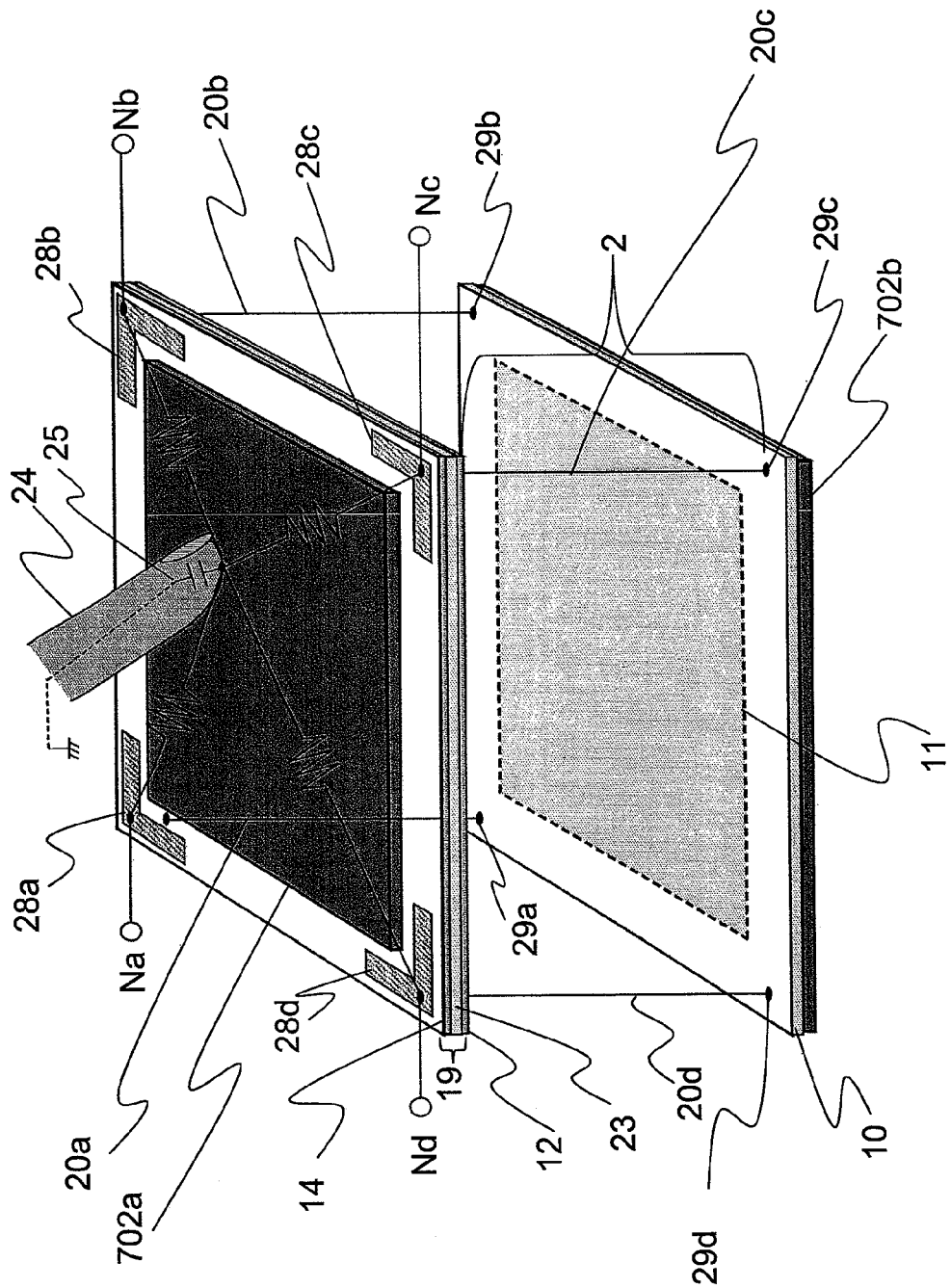
FIG. 2 is a perspective view of a display according to exemplary embodiment 2 of the present invention.

A display according to exemplary embodiment 2 of the present invention is now described with reference to the drawings.
[Description of Formulation]
FIG. 2 shows a perspective view of a display according to exemplary embodiment 2 of the present invention. The display 1 includes a substrate A 10, an opposing substrate 19, an electro-optical material 2, such as liquid crystal, sandwiched in-between these substrates, and polarizing plates 702a, 702b.

The opposing substrate 19 is formed with a substrate B 23, such as a glass substrate, a color filter, not shown, provided on a side of the substrate B 23 facing the liquid crystal, an electrically conductive film A 12, provided on the liquid crystal side surface of the color filter, and an electrically conductive film B 14 formed on the opposite surface of the substrate B 23. The electrically conductive film A 12 and the electrically conductive film B 14 may, for example, be transparent electrically conductive films of ITO.

The polarizing plate 702a is stuck with a bond to the electrically conductive film B 14, while the other polarizing plate 702b is stuck with a bond to the back surface of the substrate A10.

On the substrate A 10, there are formed a plurality of electrodes, not shown, for applying an electrical signal to the electro-optical material 2, and electrodes 29a to 29d for setting up electrical connection with the electrically conductive film A 12. The electrical connection between the electrically conductive film A 12 and the substrate A 10 is secured by current conduction members 20a to 20d by way of (1) a silver paste or (2) a sealant including electrically conductive particles.

At the four corners of the electrically conductive film B 14, four flexible printed circuits (FPCs), having four electrodes 28a to 28d, each in the form of an uppercase letter L, are provided and are electrically interconnected via anisotropic conductors, not shown. In FIG. 2, these four nodes are labeled Na, Nb, Nc and Nd. To these nodes are connected respective terminals of a current detection circuit which will be explained subsequently.

In the display 1, a viewing area 11 is formed by figurative (patterned) logical product of the shapes of the plural electrodes (FIG. 3), provided on the substrate A 10 for affording electrical signals to the liquid crystal, and the shape of the electrically conductive film A 12. Also, in the display 1, a desired picture image may be demonstrated by forming an electrical field by two electrodes and by controlling the polarized state of light transmitted through the liquid crystal layer.

Figure 3:
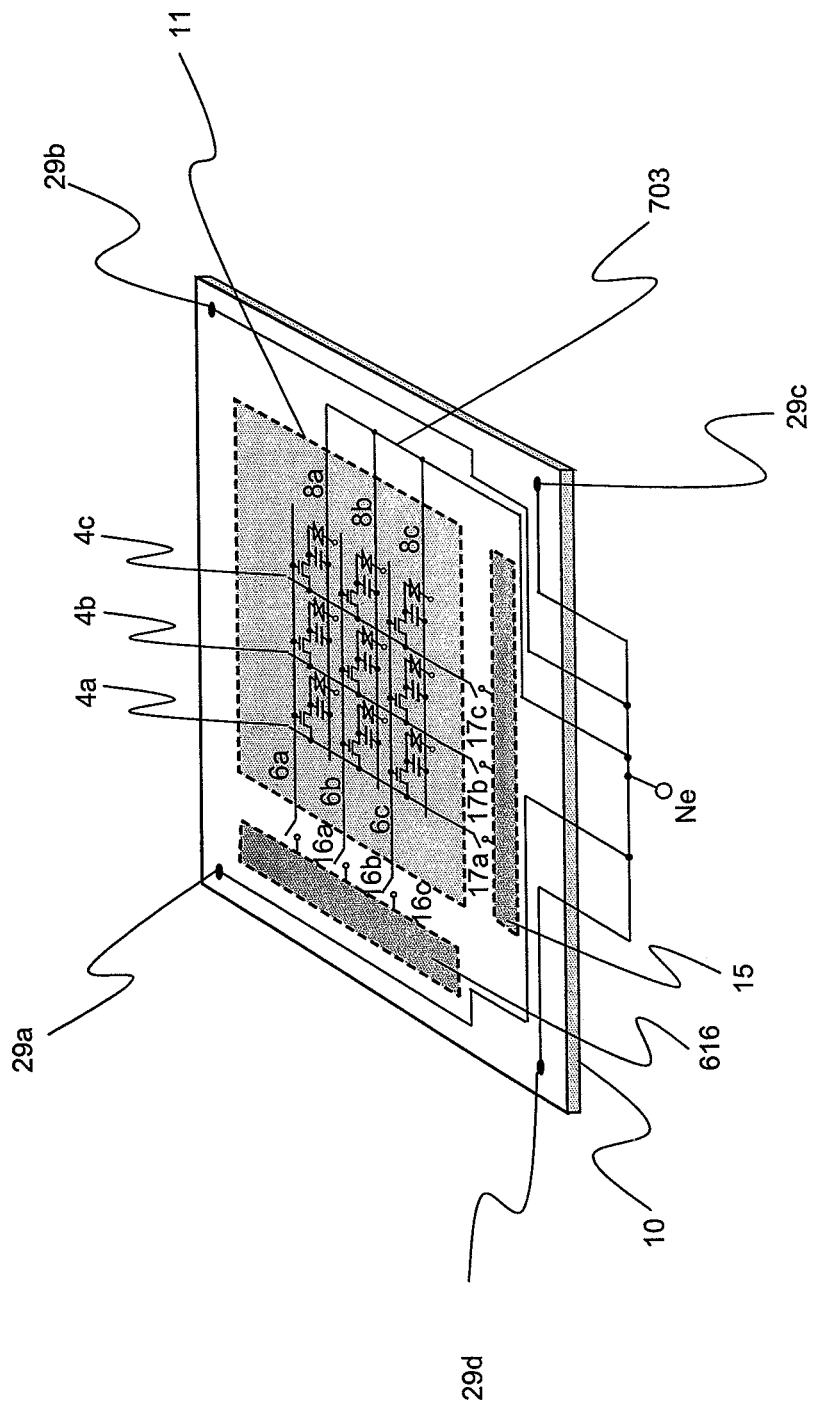
FIG. 3 is a perspective view of a substrate of the display according to the exemplary embodiment 2 of the present invention.

The substrate A10 in the display 1 is now described in detail with reference to the drawings. FIG. 3 depicts a perspective view showing the substrate A 10 in the display of the present exemplary embodiment.

A pixel matrix part is provided in register with the viewing area 11 on the substrate A 10. The pixel matrix part includes a plurality of signal lines 4a to 4c, a plurality of scanning lines 6a to 6c, intersecting these signal lines, and a plurality of pixel circuits arranged at points of intersection of the signal and scanning lines. Each pixel circuit is made up of a pixel switch TFT, a storage capacitance connected to the switch TFT, and a pixel electrode. To gate electrodes of the pixel switches TFT are connected the scanning lines 6a to 6c that control the on/off of the TFTs. The storage capacitance and the pixel electrode are connected to one of the drain electrode and the source electrode of the pixel switch TFT, and the signal lines 4a to 4c that deliver signals to the pixel electrodes are connected to the other electrode. A plurality of the pixel circuits share storage capacitance lines 8a, 8b and 8c. A plurality of conductors 40, namely the signal lines 4a to 4c, scanning lines 6a to 6c and the storage capacitance lines 8a to 8c, affording electrical signals to the electro-optical material 2 (liquid crystal), are routed for extending from inside to outside of the viewing area 11.

A plurality of driving circuits is provided outside the viewing area 11 for driving the viewing area 11. Specifically, as the driving circuits, there are provided a signal line driving circuit 15 for driving the signal lines, and a scanning line driving circuit 616 for driving the scanning lines. A circuit that affords voltage signals to the storage capacitance lines 8a to 8c is provided outside the substrate A 10 and is connected to a node Ne.

There are provided switches 16a to 16c for signal paths of the scanning lines 6a to 6c, while there are provided switches 17a to 17c for signal paths of the signal lines 4a to 4c. By turning the switches 16a to 16c off, the scanning lines 6a to 6c, the major portion of which is within the viewing area 11, present high impedance to the circuitry outside the viewing area 11, and are in floating state. Likewise, by turning the switches 17a to 17c off, the signal lines 4a to 4c, the major portion of which is within the viewing area 11, present high impedance to the circuitry outside the viewing area 11, and are in floating state.

On the other hand, the storage capacitance lines 8a to 8c are routed so as to be branched lines of a storage capacitance bus line 703 provided on an outer rim of the viewing area 11. The storage capacitance bus line 703 is electrically connected to the electrically conductive film A 12 via current conduction means 20a to 20d. In short, the storage capacitance lines 8a to 8c, storage capacitance bus line 703 and the electrically conductive film A 12 are electrically connected to one another.

In the present exemplary embodiment, the substrate A 10 is prepared using the low-temperature manufacture process for the polysilicon TFT, for example, while the switches 16a to 16c and 17a to 17c are each constructed by an analog switch which is an n-type TFT. On the other hand, the signal line driving circuit 15 is prepared by the combination of plurality of n-type TFTs and plurality of p-type TFTs which compose CMOS circuit. The scanning line driving circuit 616 is also prepared by both types of TFTs.

Figure 4:
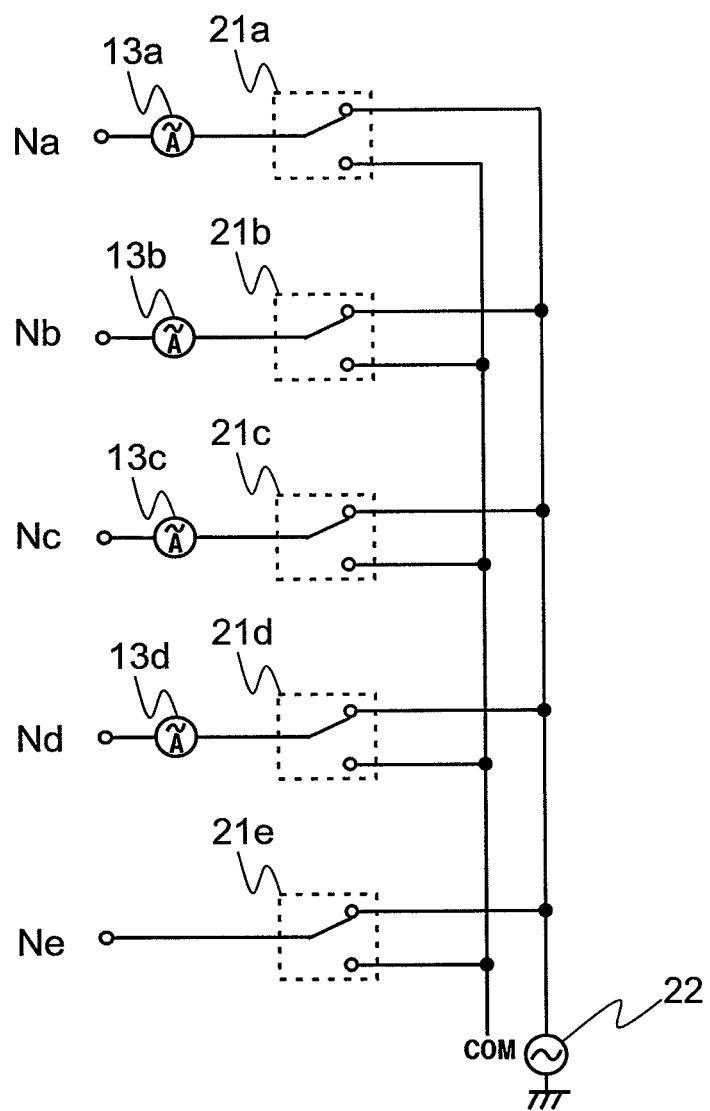
FIG. 4 is a diagram showing a circuit connected to the display according to the exemplary embodiment 2 of the present invention.

FIG. 4 depicts a circuit diagram of a circuit connected to the display 1 of the present exemplary embodiment. Referring to FIG. 4, a circuit connected via the nodes Na, Nb, Nc and Nd of the electrically conductive film B 14 and the node Ne of the display substrate is explained. The nodes Na to Ne shown in FIG. 4 correspond to the nodes Na to Nd shown in FIG. 2 and to the node Ne shown in FIG. 3.

To the nodes Na to Nd are connected single pole double throw switches 21a to 21d, respectively, via current detection circuits 13a to 13d, respectively. To one of two contacts each of the single pole double throw switches 21a to 21d is connected an ac voltage source 22. To the other contact, that is, a node labeled COM in FIG. 4, is connected a storage capacitance line driving circuit, not shown. The waveform of the ac voltage may, for example, be a sine wave.

The electrically conductive film B 14, current detection circuits 13a to 13d, single pole double throw switches 21a to 21d and the ac voltage source 22 are connected in this order along signal paths. This arraying order is crucial so as not to detect charging/discharging currents of the parasitic capacitances of the single pole double throw switches 21a to 21d. In case the electrically conductive film B 14, single pole double throw switches 21a to 21d, current detection circuits 13a to 13d and the ac voltage source 22 are connected in this order, the charging/discharging currents of the parasitic capacitances of the single pole double throw switches 21a to 21d are detected by the current detection circuits 13a to 13d in addition to the charging/discharging currents of the electrically conductive film B 14. This should waste the limited signal dynamic range and hence is not desirable.

To the node Ne is connected a contact of a single-pole double-throw switch 21e. To one of the other two contacts of the single-pole double-throw switch 21e is connected the ac voltage source 22 and, to the remaining contact, the storage capacitance line driving circuit is connected. By this configuration, one of the two signals, as selected by the single-pole double-throw switch 21e, is delivered to the storage capacitance lines 8a to 8c and to the electrically conductive film A 12.

In the following description, subscripts a to d of the single pole double throw switches 21a to 21d or the current detection circuits 13a to 13d are sometimes dispensed with. These subscripts are, however, appended if it is necessary to specify the particular components.

[Description of Operation]

Figure 5:
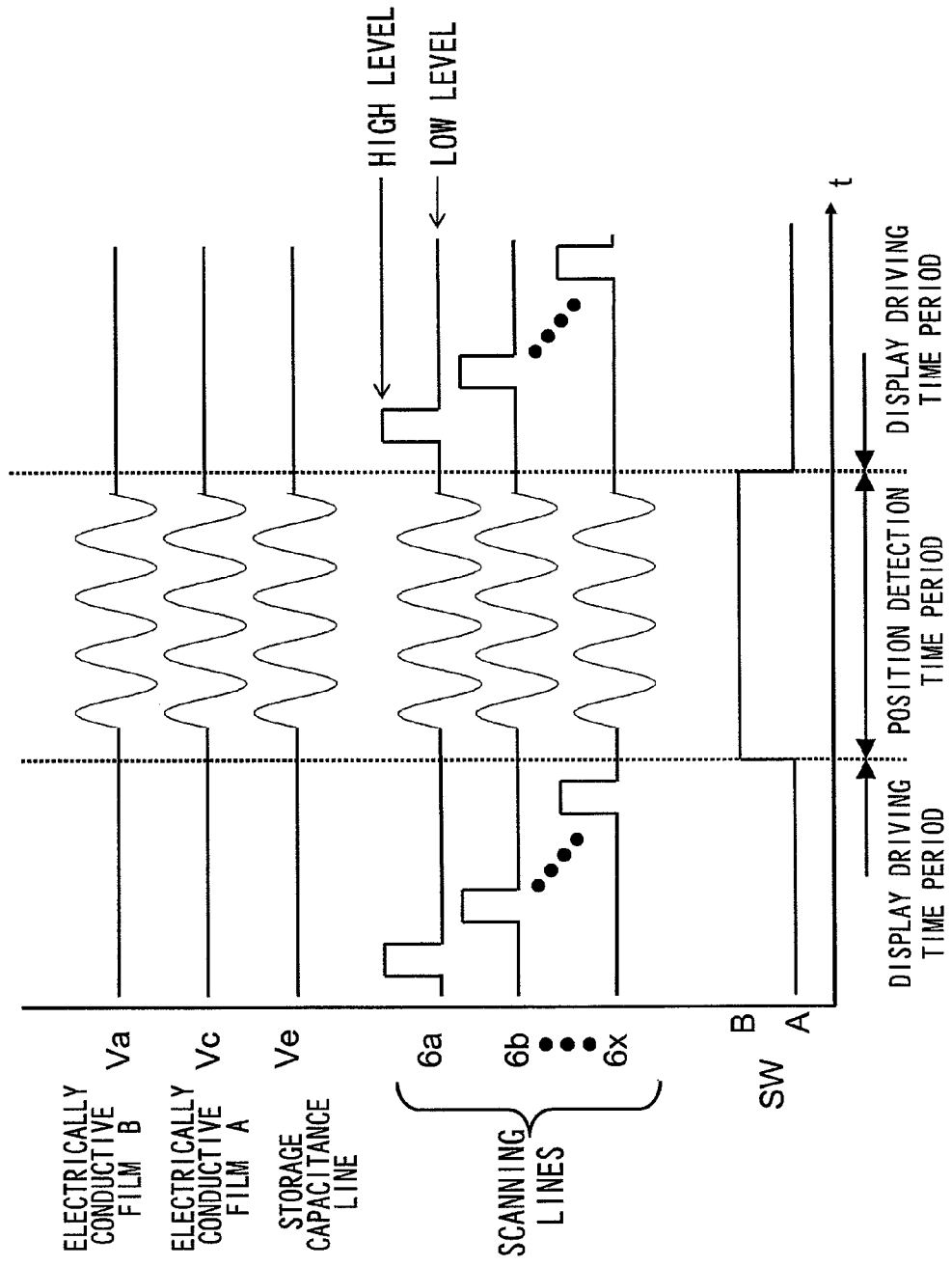
FIG. 5 is an example timing chart showing voltages at various interconnects of the display according to the exemplary embodiment 2 of the present invention.

The operation of the display 1 of the present Example is now described. Initially, the overall structure and the operation of the display 1 are described with reference to the drawings. FIG. 5 depicts a timing chart showing voltages of main conductors of the display 1 shown in FIGS. 2 and 3. Referring to FIG. 5, Va denotes a voltage at the electrically conductive film B 14, Vc denotes a voltage at the electrically conductive film A 12 and Ve denotes a voltage at each of the respective storage capacitance lines 8a to 8x, where 8x indicates the last storage capacitance line. 6a to 6x denote the respective scanning lines in the scanning order. Although FIG. 3 shows only three scanning lines, the number of the scanning lines is arbitrary. In FIG. 5, 6x denotes the voltage on the scanning line scanned last.

Also, in FIG. 5, a waveform labeled SW denotes a voltage of a control signal that determines the states of the switches 16, 17 shown in FIG. 3 and the switches 21 shown in FIG. 4. In driving, the display 1 includes a display driving time period during which a voltage for demonstration is written in each pixel and a position detection time period during which the current detection circuits 13 detects the current to detect the position of a finger 24 or to detect whether or not touch has been made by the finger. These two time periods are temporally divided from each other. The vertical blanking period, which is the non-displaying driving period, during which scanning lines are not performing a scanning operation, may be used as the position detection time period.

During the position detection time period, the respective switches are in the states shown in FIGS. 3 and 4. That is, the switches 16a to 16c and 17a to 17c are all off. The signal lines 4a to 4c and the scanning lines 6a to 6c are in high impedance states with respect to conductors outside the viewing area 11 and in floating states. The single pole double throw switches 21a to 21d are in conducting states with respect to the ac voltage source 22 inclusive of the current detection circuits 13a to 13d. The single-pole double-throw switch 21e is rendered conductive with respect to the ac voltage source 22.

This state may be arrived at by setting the signal SW of FIG. 5 to a state B, that is, to a HIGH level.

In this switch state, the ac voltage of the same phase and the same amplitude, generated by the ac voltage source 22, is applied to the four corners of the electrically conductive film B 14. Likewise, the ac voltage is applied via switch 21e to the electrically conductive film A 12 and to the storage capacitance lines 8a to 8c. The voltages at the respective conductors are now described by referring to FIG. 5.

If attention is focused on the position detection time period of FIG. 5, it is seen that, since the ac voltage of the same phase and the same amplitude is applied to the conductors by the ac voltage source 22, the same ac voltage waveform will appear on those conductors.

The respective scanning lines 6a to 6c are at high impedances and are capacitively coupled to the electrically conductive film A 12. Hence, the voltage at the scanning lines is varied with the same amplitude as that at the electrically conductive film A 12.

The operation of the display 1, brought about by the touch with a finger 24, is now described.

The ac voltage applied from the four corners of the electrically conductive film B 14 is propagated to its entire surface, and hence the current flows through the finger via a capacitor 25 formed by the finger 24. By arithmetic operations on the signals corresponding to the currents obtained from the four current detection circuits 13a to 13d, it is possible to detect whether or not touch has been made by the finger 24 as well as the coordinates of the coordinate positions.

By way of these arithmetic operations, the following operations:

$$x = k1 + k2 \cdot (i2+i3)/(i1+i2+i3+i4) \quad (1)$$

$$y = k1 + k2 \cdot (i1+i2)/(i1+i2+i3+i4) \quad (2)$$

may be used.

In the above equations, x denotes an x-coordinate of the touch position, y denotes its y-coordinate and k1, k2 denote constants. Also, i1 to i4 denote currents detected by the current detection circuits 13a to 13d shown in FIG. 4. Specifically, the current i1 is detected by 13a, the current i2 is detected by 13b, the current i3 is detected by 13c and the current i4 is detected by 13d.

Thus, during the position detection time period, the electrically conductive film B 14 performs the role of the transparent electrically conductive film of the surface type touch sensor.

Figure 6:
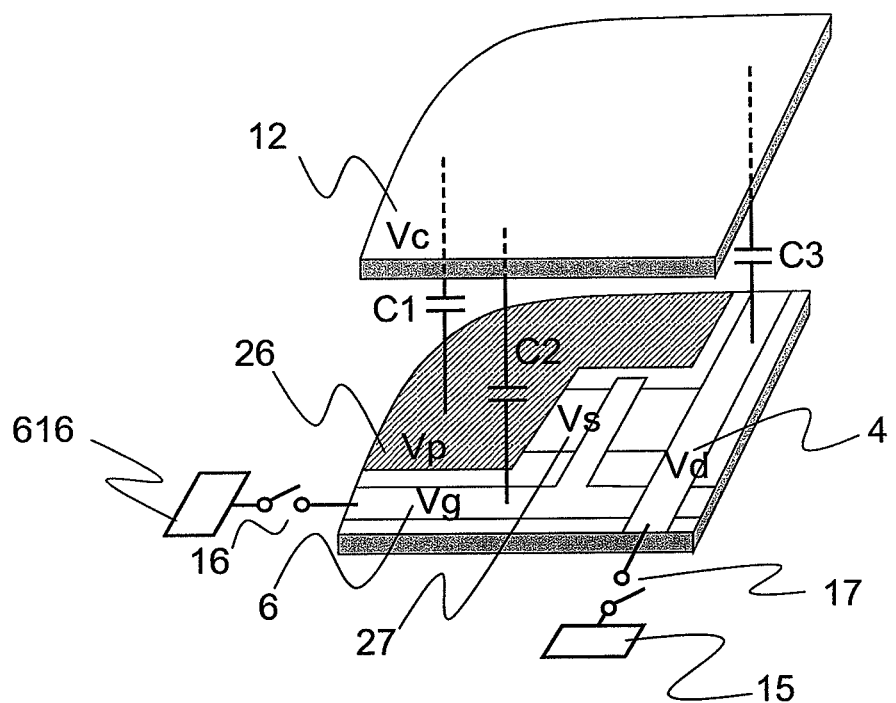
FIG. 6 is an enlarged perspective view showing a pixel circuit part in the display according to the exemplary embodiment 2 of the present invention.
Figure 7:
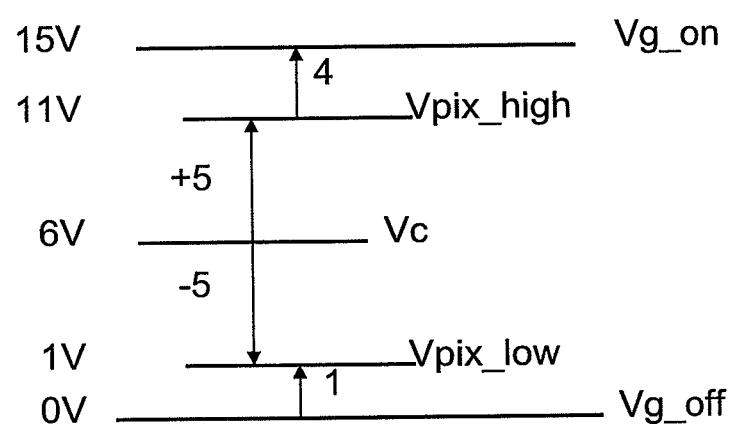
FIG. 7 is a diagram showing the display driving voltage in the display according to the exemplary embodiment 2 of the present invention.
Figure 8:
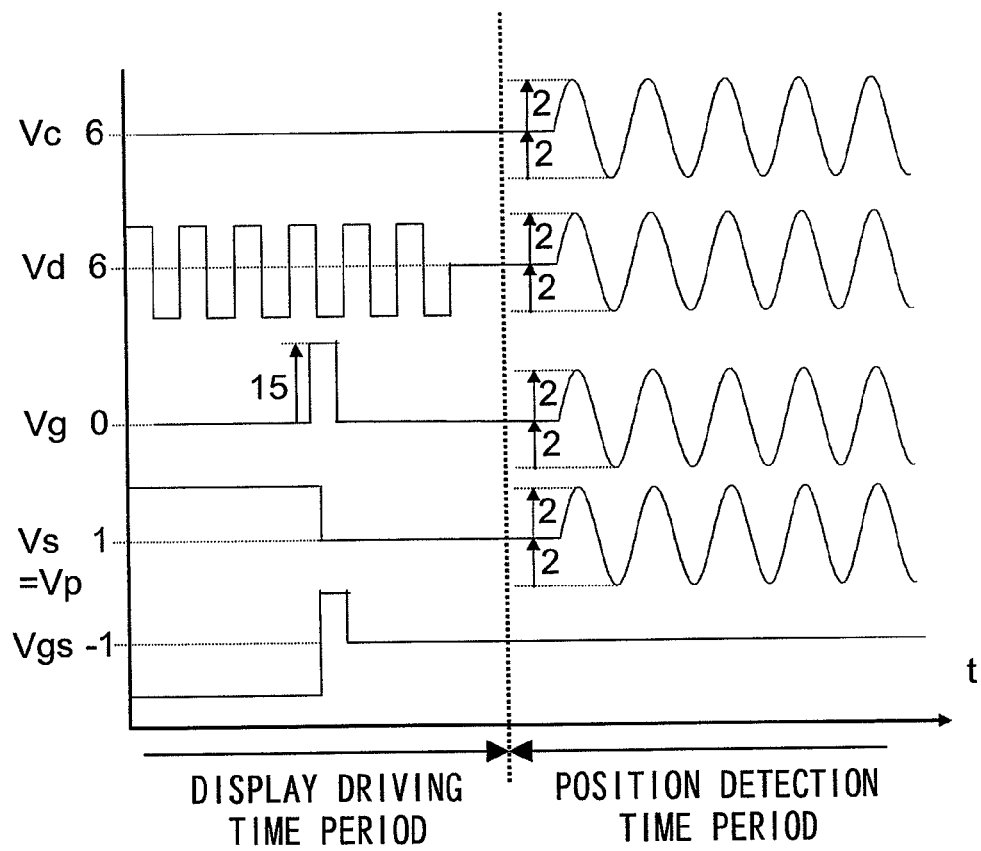
FIG. 8 is an example timing chart showing voltages at various interconnects of the display according to the exemplary embodiment 2 of the present invention.

Referring to FIGS. 6 to 8, the operation of the pixel circuit during the position detection time interval is now described.

FIG. 6 depicts an enlarged perspective view of a pixel circuit part of the display 1 of the present exemplary embodiment, inclusive of the electrically conductive film A 12, and a peripheral circuit. Referring to FIG. 6, there are shown a pixel electrode 26, connected via switch TFT, the signal line 4, and the scanning line 6 that affords a control signal that turns the pixel switch on or off. A signal line driving circuit 15 is connected to the signal line 4 via the switch 17, and the scanning line driving circuit 616 is connected via the switch 16 to the scanning line 6.

Reference letters Vc, Vp, Vs, Vg and Vd denote voltages at related conductors. The capacitors C1, C2 and C3 respectively denote capacitances between the pixel electrode and the electrically conductive film A 12, between the scanning line and the electrically conductive film A 12, and between the signal line and the electrically conductive film A 12. Although the storage capacitance or the storage capacitance line is not shown, the storage capacitance is a two-terminal capacitance device having one end electrically connected to the pixel electrode and having the other end connected to the storage capacitance line.

The driving voltage during the display driving time period of the display of the present exemplary embodiment is now described with reference to the drawings. FIG. 7 is a diagrammatic view showing an example of a display driving voltage in the display of the present exemplary embodiment. There is shown a case of using a driving method in which the voltage Vc of the electrically conductive film A 12 is kept constant, and a voltage higher by a maximum value of 5V than Vc is applied with polarity inversion to the liquid crystal. Referring to FIG. 7, the voltage Vc of the electrically conductive film A 12 is set at 6V and a voltage higher than Vc by +5V, i.e., 11V is applied via a signal line to the pixel electrode as a maximum voltage Vpix_high. On the other hand, a voltage which is −5V with respect to the voltage Vc of the electrically conductive film A 12, i.e., 1V, is applied to the pixel electrode as the minimum voltage Vpix_low. In consideration of the leakage current of the switch TFT, the gate voltage Vg_off at the switch off time is set to 0V so that the maximum gate-to-source at the switch off time will be −1V. Also, the gate voltage at the switch on time Vg_on is set to 15V so that sufficient on-current will be produced.

The voltages at the respective conductors, for the case in which the display of the present exemplary embodiment is driven under the above-described driving conditions, is now described with reference to the drawings. FIG. 8 depicts a typical timing diagram showing voltages at respective conductors of the display of the present exemplary embodiment. During the display driving time interval, shown in FIG. 8, a pulse signal of the positive polarity is applied to Vg to write 1V at a pixel electrode Vp. The switches 16, 17 are then turned off to transfer to the position detection time period, during which the ac voltage is applied to the electrically conductive film A 12, as set forth above. Here, an ac voltage Vc of an offset voltage of 6V and an amplitude of 2V are applied. The respective conductors, facing one another via the liquid crystal layer of an optional thickness, for example, 4 μm, that is, the pixel electrodes, scanning lines and the signal lines, are at high impedance, and are capacitively coupled via capacitors C1 to C3 to the electrically conductive film A 12. Hence, the voltages at these conductors are varied with the same amplitude as that of the electrically conductive film A 12. Thus, in the example shown in FIG. 8, the voltage Vd at the signal lines is a voltage with an offset voltage of 6V and an amplitude of 2V, because it is 6V and the signal lines are in the high impedance state. Likewise, the scanning line voltage has an offset voltage of 0V and an amplitude of 2V. The voltage Vp at the pixel electrode has an offset voltage of 1V and an amplitude of 2V, in case of the voltage Vp taking on a minimum value. It is observed that, since the pixel electrode is connected to the source electrode of a switch TFT (Thin Film Transistor), the voltage Vs of the source electrode of the switch TFT is equal to the voltage Vp of the pixel electrode. In this manner, the voltages at the total of the conductors in the pixel circuit are varied in agreement with the amplitudes of the voltages at the transparent electrically conductive film. Hence, even during the position detection time period, the gate-to-source voltage Vgs of the switch TFT is maintained at a voltage that prevailed at the close of the display driving time period, that is, at a voltage of −1V in the example shown in FIG. 8.

To summarize, if an ac voltage is applied to the electrically conductive film A 12 during the position detection time period, the voltages at the total of the conductors provided in the pixel circuit are varied with the same amplitude as that at the electrically conductive film A 12. Hence, the voltage (Vc-Vp) applied to the liquid crystal or the gate-to-source voltage Vgs of the switch TFT is not varied. The driving of the display during the position detection time period is thus not a factor of picture quality degradation.

On the other hand, during the display driving period, the states of the respective switches are reversed from those shown in FIG. 3 or 4. That is, the switches 16a to 16c and the switches 17a to 17c are all on so that the signal lines 4 and the scanning lines 6 are in low impedance states with respect to the conductors outside the viewing area 11. The single pole double throw switches 21 are rendered conductive to the COM side. The voltage similar to that of the counter electrode in a conventional LCD is applied by the storage capacitance line driving circuit to the storage capacitance lines 8, electrically conductive film A 12 and to the electrically conductive film B 14. The voltage for display is written by the electrically conductive film A 12 and the pixel electrodes in the electro-optical material 2 (liquid crystal) arranged in-between the electrically conductive film A 12 and the pixel electrodes.

This state may be arrived at by setting the signal SW of FIG. 5 to A (that is, to a low level). In this state, the scanning lines are swept in a forward direction as in conventional active matrix type LCD, such as to write the voltage for display through the signal lines in the pixels.

[Description of Meritorious Effect]

A first meritorious effect of the display of the present exemplary embodiment is that the parasitic capacitance of the electrically conductive film B 14, more precisely, the signal detected by the parasitic capacitance, may drastically be reduced. A second meritorious effect of the display of the present exemplary embodiment is that variations in the static capacitance related to display contents of the display may be made smaller than the static capacitance formed by the human finger 24 and the electrically conductive film B 14. In the following, a control experiment, conducted for proving these meritorious effects, is now explained along with these favorable effects.

Figure 9:
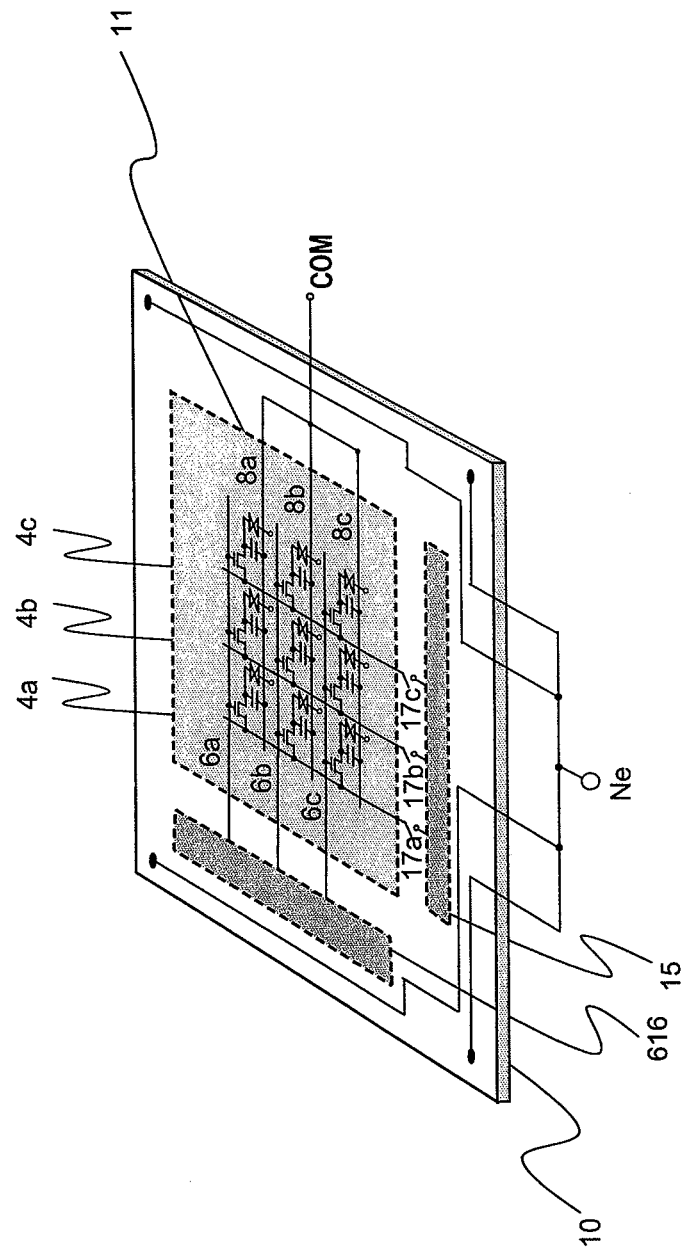
FIG. 9 is a perspective view of a substrate of the display apparatus to be used for a control experiment for comparison with the display according to the exemplary embodiment 2 of the present invention.

FIG. 9 depicts a substrate A 10 of a display prepared for conducting a control (comparative) experiment for the display of the present exemplary embodiment. The substrate A10 of FIG. 9 differs from the display A 10 of the present exemplary embodiment (FIG. 3) as to the presence/absence of the set of switches that set high impedance in the scanning lines 6a to 6c and the presence/absence of the means for applying ac voltage to the storage capacitance lines 8a to 8c. That is, with the substrate A10 of FIG. 9, the scanning lines 6a to 6c, extending within and outside the viewing area, are directly connected to the scanning line driving circuit, as in the substrate in the conventional display. Hence, the substrate A10 of FIG. 9 cannot be set in floating state during the position detection time period. The storage capacitance lines 8a to 8c are connected to the conventional storage line driving circuit, and hence cannot be driven to apply the sine wave during the position detection time period, and hence cannot be set in the floating state. A related-art example of a substrate of a conventional display is shown in FIG. 2 of JP Patent Kokai Publication No. JP-P2007-240830A.

The points common to the display for control experiment (FIG. 9) and the display of the present exemplary embodiment are now explained. The opposing substrate of the display prepared for the control experiment is the same as the opposing substrate 19 in the display of the present exemplary embodiment shown in FIG. 2. In short, the electrically conductive position detection film B 14 is formed on the surface of the opposing substrate 19 that may be touched by the finger, and the electrically conductive film A 12 is formed on the surface of the opposing substrate 19 contacted with the liquid crystal. The circuitry connected to the nodes Na to Ne is the same as that of the display of the present exemplary embodiment shown in FIG. 4. Thus, during the position detection time period, an ac voltage with the same amplitude and phase may be applied to the electrically conductive position detection film B 14 and to the electrically conductive film A 12.

For each display, the current that flows through the current detection circuit 13 during the position detection time period was measured and the static capacitance of the electrically conductive position detection film B 14 was calculated from the current value measured. Specifically, as white color was displayed on the entire display surface, measurements were made of the static capacitance when the finger has not touched the polarizing plate 702a and that when the finger has touched it. The static capacitance when the finger has not touched the polarizing plate is equivalent to the parasitic capacitance of the electrically conductive film B 14. In addition to the parasitic capacitance in case of displaying white color on the entire display surface, the parasitic capacitance in case of displaying the black color on the entire display surface was also measured.

The result of the experiment is now explained with reference to the drawings. FIG. 10 depicts the results of the control experiment for the display of the present exemplary embodiment. First, attention is focused on the parasitic capacitance, that is, the static capacitance when the finger has not touched the display. The parasitic capacitance in case the white color is displayed on the entire display surface, which was 133 pF with the display of the control experiment, is 7.8 pF with the display of the present invention. This enables quantitative determination of the first meritorious effect as set forth above. In actuality, with the use of the display of the present exemplary embodiment, the parasitic capacitance can be reduced to $1/17$ of that of the control experiment. In consideration that the static capacitance of a capacitor 25 (FIG. 2), equivalent to the finger 24, is ca. 11 pF, the parasitic capacitance of 133 pF, obtained with the control experiment, exceeds 12 times that of the finger. This should lead to high cost and low SN ratio of the signal processing circuit used for position or touch detection because a signal corresponding to the parasitic capacitance plus the static capacitance of the finger is delivered to the signal processing circuit such that $12/13$ of the input signal amplitude is derived from the parasitic capacitance. Hence, the major part of the limited dynamic range of the circuit is taken up by the parasitic capacitance. On the other hand, with the display of the present exemplary embodiment, this parasitic capacitance is 7.8 pF which is smaller than the static capacitance of the finger which is 11 pF.

Analysis of FIG. 10 from a different viewpoint reveals the following. The display for the control experiment suffers a problem that it is not possible to accurately detect whether or not the finger touch has been made on the basis only of the static capacitance detected. Referring to FIG. 10, the parasitic capacitance of the display for the control experiment is 133 pF for white color display, while being 155 pF for black color display. On the other hand, the static capacitance detected in case of touch with white color display is 144 pF obtained as the sum of the parasitic capacitance and the finger capacitance. Comparison of the two indicates that increase of the static capacitance (22 pF) resulting from changing the color display from white to black is larger than the increase of the static capacitance by touch (11 pF).

Meanwhile, whether or not finger touch has been made is usually detected as follows: It is supposed that a static capacitance in case touch has not been made is set as a reference value, and the sum of this reference value and a preset static capacitance is set as a threshold value. If, in this case, a static capacitance detected exceeds the threshold value, it is detected that a touch has been made. With the display for the control experiment, the change caused by the displayed color from white to black is greater than the change caused by whether or not touch has been made, and hence it is not possible to detect whether or not touch has been made.

With the display of the present exemplary embodiment, the parasitic capacitance at the time of white color display is 7.8 pF, while that at the time of black display is 8.0 pF. Thus, the parasitic capacitance is scarcely changed with the display contents (white or black). On the other hand, the static capacitance in case touch has been made is 19.6 pF. It is thus possible to accurately detect whether or not touch has been made. In this manner, the change in the static capacitance resulting from change of display contents of the display may be made smaller than the static capacitance formed by the finger 24 and the electrically conductive film B 14. The display of the present exemplary embodiment may thus yield the second meritorious effect as set forth above.

It is observed that the mechanism of the display of the present exemplary embodiment yielding the meritorious effect as set forth above and the display for the control experiment suffering the above problem is far beyond predictions of those skilled in the art. The reason is that inference from the technique stated in Patent Document 4 or 6 should lead to the conclusion that the display for control experiment would be free from the above problem. The inventors of the present invention thought that, since the same ac voltage as that applied to the electrically conductive film B 14 is applied to the electrically conductive film A 12 of the display of the control experiment, the functional equivalent to that of a protective plane layer shown in Patent Document 4 would be derived. That is, the inventors thought that the parasitic capacitance of the electrically conductive film B 14 should be sufficiently small. In addition, the inventors thought that, since the same ac voltage has been applied to the electrically conductive film B (electrically conductive position detection film) and to the electrically conductive film A 12, the voltage induced in the touch panel as a result of the potential difference between the electrically conductive film A 12 and the electrically conductive film B 14 could be reduced to a small value that would not deteriorate the position detection accuracy. However, the above result of the experiment was contrary to these expectations.

The present inventors have analyzed these phenomena and clarified the grounds to arrive at the present invention. In the following, the reason the above problem arises in the display for the control experiment as well as the display by the related Publications, and the reason the problem may be overcome by the invention of the present exemplary embodiment, will be clarified on the basis of the results of analyses by the present inventors.

FIGS. 11A and 11B depict models for analyzing, based on the circuit simulation, the result of the control experiment for the display of exemplary embodiment 2 of the present invention. FIG. 11A shows a model for a display for the control experiment. An electrically conductive film B 14 (electrically conductive position detection film), an electrically conductive film A 12 and a substrate A 10 are resistance planes. The sheet resistances of the electrically conductive films B 14 and A 12 are respectively set to 800Ω/☐ and 15Ω/☐ which are equal to those used on an actual display used.

The resistance plane, equivalent to the substrate A 10, is a resistance model made up of signal lines, gate lines and storage capacitance lines formed on the substrate A10. The sheet resistance of the resistance plane was set to 1 mΩ/☐. There are present capacitors C1, C2, with the static capacitance values of 895 pF and 26.5 nF, respectively, between the resistance planes. These values of the static capacitances are based on measured results for an LCD having a diagonal length of 3.5 inch.

The conductors, including signal lines, gate lines and storage capacitance lines, provided in the display for the control experiment, are not in floating state, and are connected to a fixed potential. Hence, if an ac based circuit model is envisaged, the substrate A10 may be thought of as being connected to a ground 704 via interconnects.

The ac voltage source 22 and the current detection circuit 13 were connected to these resistance planes, as in an actual display. Although the ac voltage source 22 and a current detection circuit 13 are shown only at a corner, it will be appreciated that, for actual analysis, these are similarly connected at the remaining three corners.

The resistances of the resistance planes and the capacitors formed between the resistance planes are distributed constants. For circuit simulation, these resistances and capacitances are divided into a plurality of resistance elements and a plurality of capacitor elements, respectively.

FIG. 11B shows a model of a display of the present exemplary embodiment. FIG. 11B differs from FIG. 11A in that the substrate A is not connected to the ground directly, but is so connected via a capacitor C5. The reason is that, since the signal lines 4 and the scanning lines 6 are to be in floating state, these are not connected to the ground directly but are so connected via an off-capacitance of a switch generated when the lines are in the floating state. It is necessary for the model to express this condition. The capacitance of 200 pF of the capacitor C5 shown is an empirical value obtained by experiments.

In FIG. 11B, the ac voltage source 22, current detection circuits 13 and the capacitor C5 are shown only at a corner of each substrate. It is assumed that, in conducting an analysis, these components are also connected at the remaining three corners. Hence, the substrate A 10 is connected at the four corners to the ground via a capacitor with the capacitance equal to the sum of the capacitances, that is, 800 pF.

In an actual display, the signal line 4 and the scanning lines 6 are in floating states. However, an ac voltage is applied to the storage capacitance lines 8 which are not in the floating state. However, the case the ac voltage is applied to the storage capacitance lines 8 may be deemed to be equivalent to the case the storage capacitance lines 8 are in the floating state as are the scanning lines 6. Hence, an analysis is now made based on a model shown in FIG. 11B.

An ac voltage of 100 kHz of equal amplitude and phase was applied to the electrically conductive film B 14 and to the electrically conductive film A 12 of each of the two models, whereupon the parasitic capacitance of the electrically conductive film B 14 was found from calculations from the current value of the current detection circuit 13. The parasitic capacitance of the electrically conductive film B 14 for the model of the display for the control experiment was found to be 160 pF (measured value: 133 pF), while that for the model of the display of the present exemplary embodiment was found to be 4.7 pF (measured value: 7.8 pF). Thus, the values approximately equal to the measured values were obtained. The fact that the current flows through the electrically conductive film B 14 and the parasitic capacitance is observed indicates that the current is flowing through C1 and C3, which C1 and C3 are each approximated by a plurality of capacitors, as set forth above. The in-plane current distribution can be known by scrutinizing the currents flowing through these capacitors.

Figure 12A:
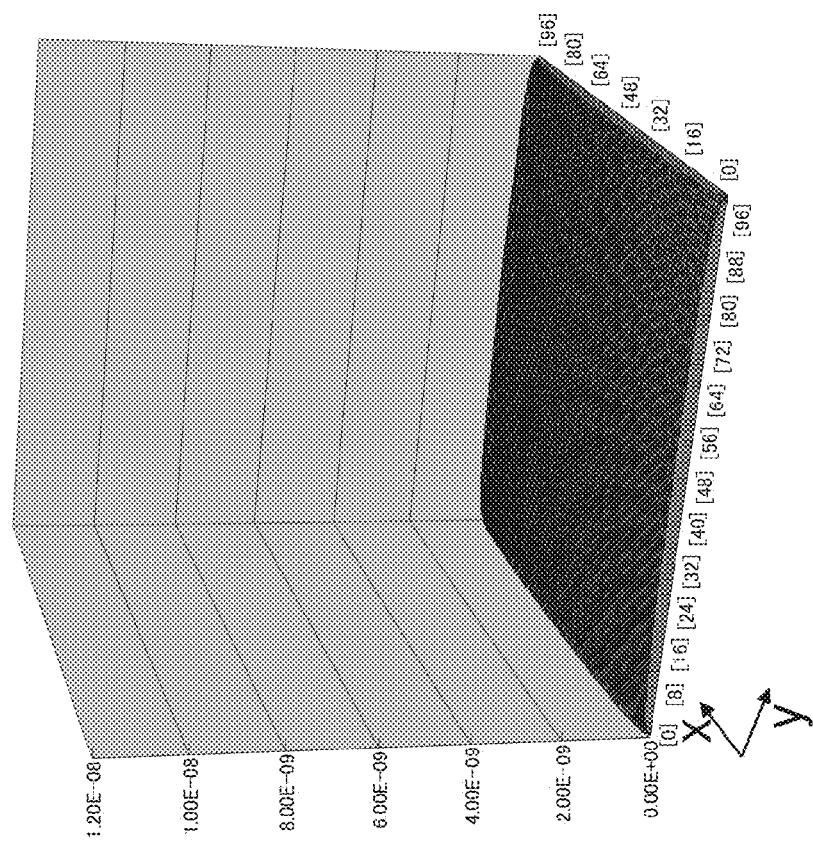
FIGS. 12A and 12B show examples of in-plane distribution of the current flowing in a capacitor arranged between a position detection electrically conductive film and an counter electrode.
Figure 12B:
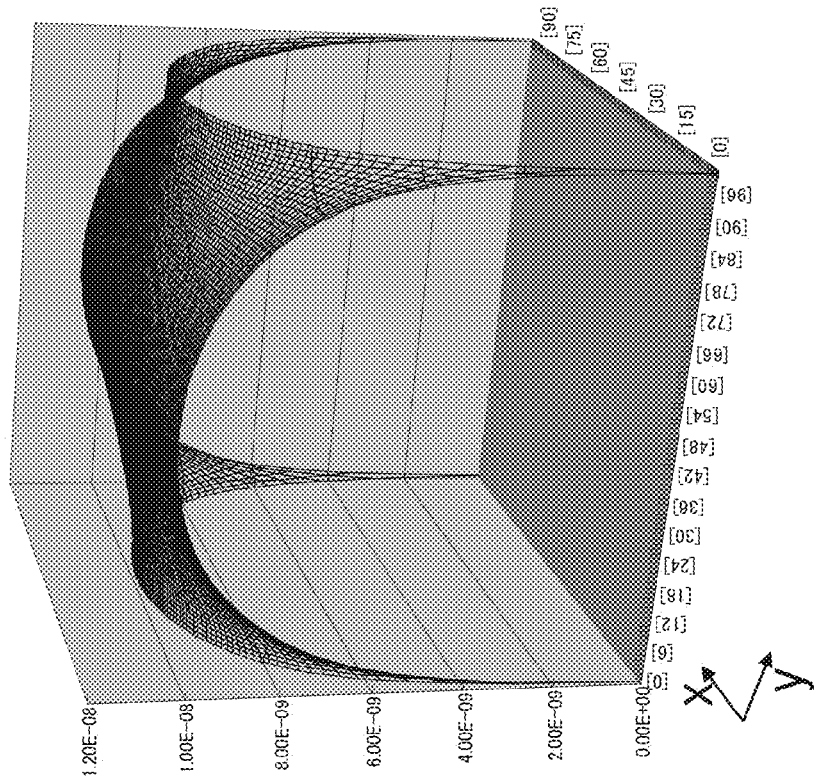

FIGS. 12A and 12B show respective examples of the in-plane distribution of the current flowing through the capacitors between the electrically conductive film B (electrically conductive position detection film) 14 and the electrically conductive film A (counter electrode) 12. More specifically, FIG. 12A shows the current distribution in the display for the control experiment and FIG. 12B shows that in the display of the present invention. FIGS. 12A and 12B show currents plotted at capacitor elements at coordinate positions x, y of the electrically conductive film B 14, that is, at a multiplicity of capacitor devices fractionated from C1 and C3 of FIG. 11. The current flowing in the model for the control experiment, shown in FIG. 12A, is larger than that flowing in the model of FIG. 12B. As characteristic of the model for the control experiment, the current values at the four corners are low, and increase towards the center.

The current flows in the model for the control experiment, even though the ac signal of the same phase and the same amplitude is supplied to the electrically conductive film B 14 and the electrically conductive film A 12. This indicates that a voltage at a given point on the electrically conductive film B 14 differs from one at the corresponding point on the electrically conductive film A 12. It is seen from the above results that, although the points at the four corners are at the same potential, the potential difference becomes greater between the two planes, that is, between the electrically conductive film B 14 and the electrically conductive film A 12, as the center of the plane is approached.

This results from the fact that the phase and the amplitude at near the center of the plane of the electrically conductive film A 12 differ from those at near its edge on account of the time constant determined by the static capacitance of the substrate A10 when looking from the electrically conductive film A 12 and the resistance of the electrically conductive film A 12. In particular, in the configuration of FIG. 11A, the static capacitance of the substrate A10 when looking from the electrically conductive film A 12, that is, the static capacitance of the capacitor C2, is extremely high and is 26.5 nF. For this reason, a large current flows between the two planes despite the fact that the ac signal which is the same as that applied to the electrically conductive film B 14 is supplied from each of the four corners of the electrically conductive film A 12. As a result, the parasitic capacitance of the electrically conductive film B 14 appears to be large.

On the other hand, in the model of the display of the present exemplary embodiment (FIG. 11B), the capacitance of the electrically conductive film B 14 as seen from the electrically conductive film A 12 is a series connection of the capacitances of the capacitor C4 (26.5 nF) and four times the capacitance of the capacitor C5 (800 pF), that is, 780 pF. This capacitance value is extremely small in comparison with that of the configuration of FIG. 11A, as a result of which the voltage signal similar to that flowing in the electrically conductive film B 14 is propagated to an inner part of the plane of the electrically conductive film A12. The parasitic capacitance of the electrically conductive film B 14 then will appear to be small. This accounts for the above first meritorious effect obtained with the display of the present exemplary embodiment.

The reason the display of the present exemplary embodiment yields the second meritorious effect is now described. The static capacitance of the capacitors C2 and C4 between the electrically conductive film A 12 and the substrate A 10 (FIGS. 11A and 11B) is a function of the dielectric constant of the electro-optical material 2 (a liquid crystal as a dielectric material, for example). Since the liquid crystal exhibits dielectric constant anisotropy, the value of its dielectric constant along the long axis direction of the liquid crystal molecule is varied by a factor of three from that in a direction normal thereto. In particular, in a TN (Twisted Nematic) liquid crystal display, the long axis of the liquid crystal molecule is parallel to the electrically conductive film A 12 for displaying the white color, while being normal thereto for displaying the black color. Thus, the display is influenced appreciably by dielectric constant anisotropy.

With the model of the display for control experiment, shown in FIG. 11A, the static capacitance as seen from the electrically conductive film A 12 is no other than the static capacitance of the capacitor C2. Thus, with a large value of the capacitor C2 itself, the time constant of the electrically conductive film A 12 is appreciably varied with display contents. On the other hand, with the model of the display of the present exemplary embodiment, shown in FIG. 11B, the static capacitance of the substrate A10, as seen from the electrically conductive film A 12, is roughly four times as large as the static capacitance of the capacitor C5. It is observed that, for simplifying the drawing of FIG. 11, the capacitor C5 is shown only at one corner, and that, for actual measurement and analysis, four capacitors of the same static capacitance are provided at the respective corners. Thus, with the present exemplary embodiment, the static capacitance of the substrate A10 as seen from the electrically conductive film A 12 is small, so that, if the static capacitance of C4 is changed, the static capacitance of the substrate A10, as seen from the electrically conductive film A 12, is scarcely changed. This yields the above second meritorious effect.

It is seen from above that, to arrive at the first and second meritorious effects, it is sufficient to reduce the static capacitance of the substrate A10 as seen from the electrically conductive film A 12. The display of the present exemplary embodiment is featured by setting the conductors 40 provided on the substrate A10 in the floating state, or by applying the same ac voltage as that of the electrically conductive film A 12 to the conductors 40 provided on the substrate A10.

(Third Meritorious Effect)

It has been stated above, with reference to FIG. 8, that, with the formulation of the present invention, the gate-to-source voltage Vgs of the switch TFT at the close of the display time period (−1V) is maintained even during the position detection time period. It is when the voltage written in a pixel is lowest, specifically, when it is equal to Vpix_low (1V), that the gate-to-source voltage Vgs is −1V.

On the other hand, in case of working out the inventions of Patent Document 5 or 6, the value of Vgs is varied. This will now be described with reference to FIG. 13 showing a typical timing chart of voltages at interconnects in the conventional display.

During the position detection time period, the pixel electrode is at high impedance, and is capacitively coupled via static capacitance to the electrically conductive film A 12. Hence, the potential at the pixel electrode is varied with the same amplitude as that on the electrically conductive film A 12. Thus, if the ac voltage Vc with the amplitude of 2V is applied to the electrically conductive film A 12, the potential Vp at the pixel electrode is varied with the amplitude of 2V in response thereto, as shown in FIG. 13. On the other hand, the voltage Vg at the scanning line 6 is fixed at 0V. The gate-to-source voltage Vgs of the switch TFT is thus varied, with the amplitude of 2V, with −1V as an offset voltage. That is, Vgs is varied between 1V and −3V. Thus, if the switch TFT is an n-type TFT with the threshold voltage of 0V, the switch TFT cannot be kept in an OFF state, thus deteriorating the picture quality.

Conversely, with the display of the present exemplary embodiment, Vgs of the transistor is not varied, thus yielding the meritorious effect that driving during the position detection period is not the cause of picture quality deterioration.

Exemplary Embodiment 3

Figure 16:
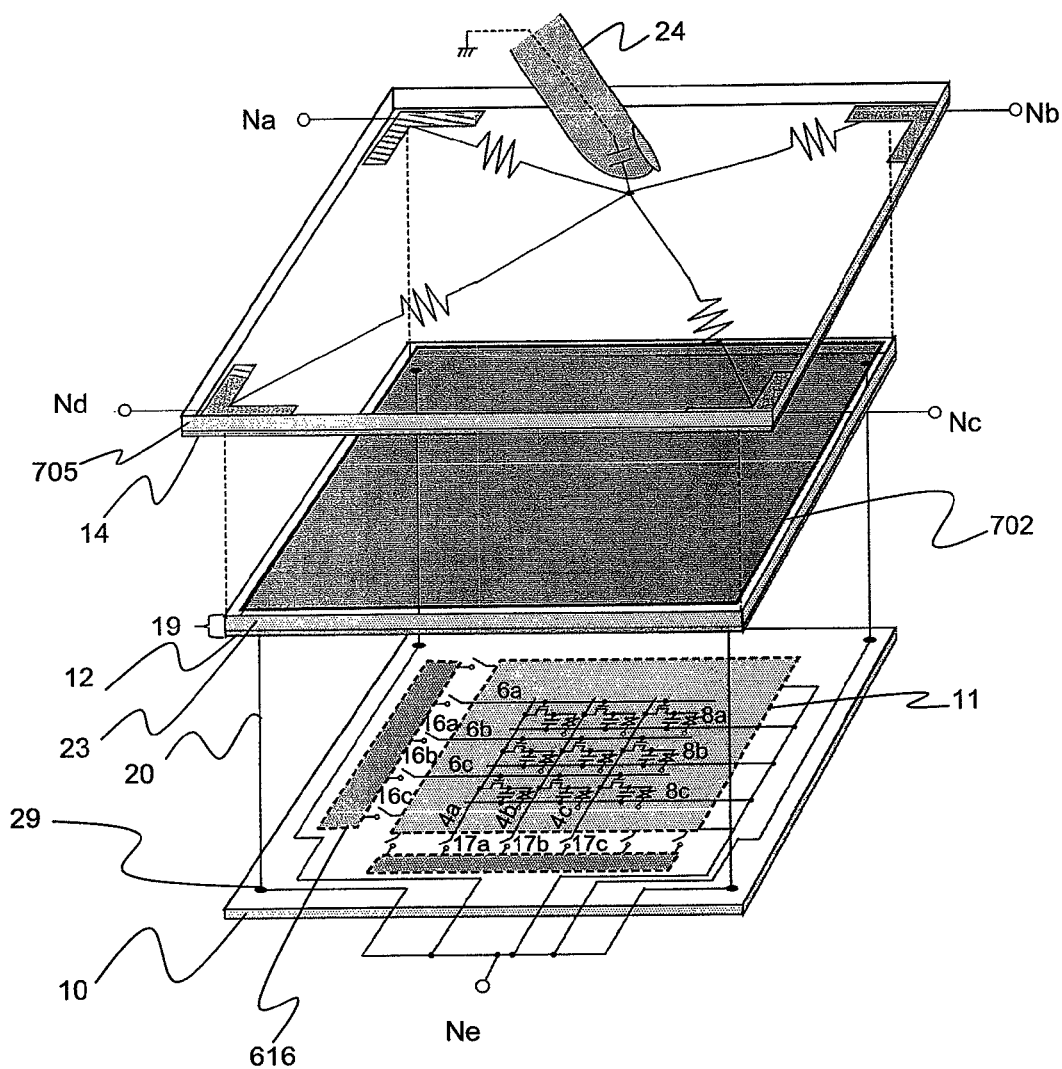
FIG. 16 is a perspective view showing an example of a display according to exemplary embodiment 3 of the present invention.

A exemplary embodiment 3 of the present invention is now described with reference to the drawings. FIG. 16 depicts a perspective view showing an example display of the present exemplary embodiment. The present exemplary embodiment is a modification of the above-described exemplary embodiment 2, in which the opposing substrate 19 is unified with the electrically conductive film B 14. In the present exemplary embodiment, a protective substrate 705 is unified with a electrically conductive film B (position detection electrically conductive film) 14. The formulation of a substrate A (display substrate) 10 is the same as that of the exemplary embodiment 2.

An opposing substrate 19 includes a substrate B23, a color filter, not shown, formed on the surface towards the electro-optical material 2 of the substrate B 23, and an electrically conductive film A 12 formed on a surface towards the electro-optical material 2 of the color filter. The electrically conductive film A 12 and the substrate A 10 are electrically connected to each other by a current conduction means 20, such as (1) a silver paste or (2) a sealant admixed with electrically conductive particles. A polarizing plate 702 is stuck with a bond to a surface of the substrate B 23 opposite to a surface thereof carrying the electrically conductive film A 12.

The electrically conductive position detection film B 14 is formed on the surface towards the opposing substrate 19 of the protective substrate 705. A flexible printed circuit (FPC) board, having a plurality of electrodes in the form of an uppercase letter L, is provided at each corner of the electrically conductive film B 14 via an anisotropic conductor. In FIG. 16, respective nodes are labeled Na to Nd. These four nodes Na to Nd and a node Ne of the display substrate are connected to the circuit shown in FIG. 4, as in the exemplary embodiment 2. The operation of the display of the present exemplary embodiment is similar to that of the above-described exemplary embodiment 2.

[Explanation of Meritorious Effect]

The first to third meritorious effects, similar to those described in connection with the exemplary embodiment 2, may also be obtained with the display of the present exemplary embodiment. Additionally, a display sturdier than the display of the exemplary embodiment 1 may be obtained with the present exemplary embodiment. The present exemplary embodiment also has a meritorious effect that it affords an electronic apparatus of a so-called seamless flat structure. The meritorious effect brought forth with the present exemplary embodiment is now described with reference to FIG. 17.

Figure 17:
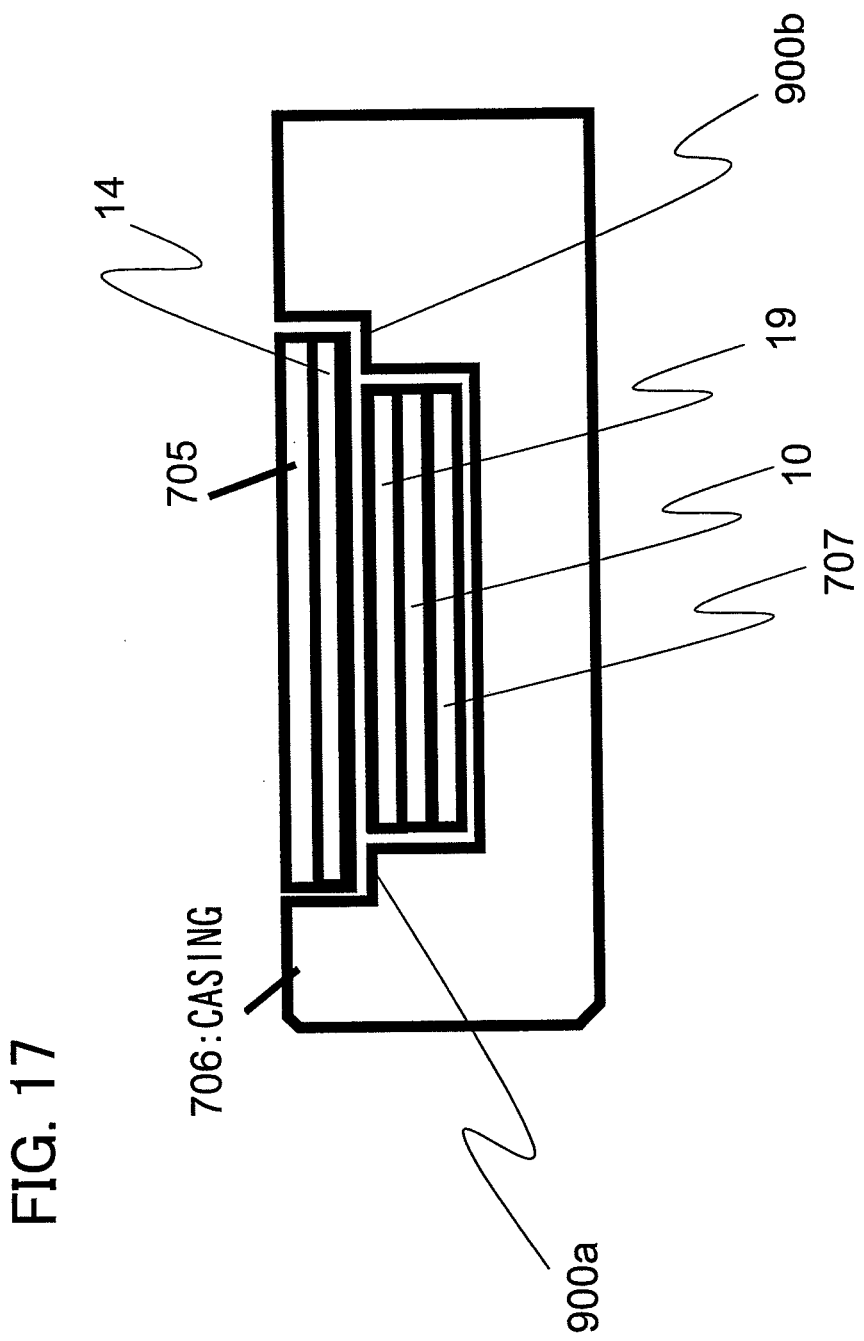
FIG. 17 is a schematic cross-sectional view of an example electronic apparatus having the display according to the exemplary embodiment 3 of the present invention.

FIG. 17 depicts a cross-sectional view showing an example of an electronic apparatus provided with a display according to the present exemplary embodiment. In the present exemplary embodiment, the protective substrate 705 is retained by surfaces 900a, 900b recessed stepwise from an upper surface of a casing. The force of a finger touch is then received by the protective substrate 705 and the casing. A display part of the electronic apparatus may be made sturdier because the force of finger touch is not directly transmitted to the opposing substrate 19.

Finger-touch variations of the display may also be eliminated. The finger-touch variations mean display variations on a display surface caused by disturbed liquid crystal alignment caused in turn by finger touch at the display surface.

It is unnecessary to provide interconnects on the touch surface of the protective substrate 705. Hence, a so-called seamless electronic apparatus, presenting no height difference between the touch surface and the casing surface, may be implemented by having the protective substrate accommodated in a casing in which the touch surface is flush with the casing surface, as shown in FIG. 17.

Exemplary Embodiment 3 Bis

An exemplary embodiment 3 bis is now described with reference to FIGS. 24 to 29. The present exemplary embodiment corresponds to a case where, as an example, the present invention is worked out using a conventional TFT liquid crystal display. As an example of the conventional TFT liquid crystal display, an amorphous silicon TFT liquid crystal display may be used.

Figure 24:
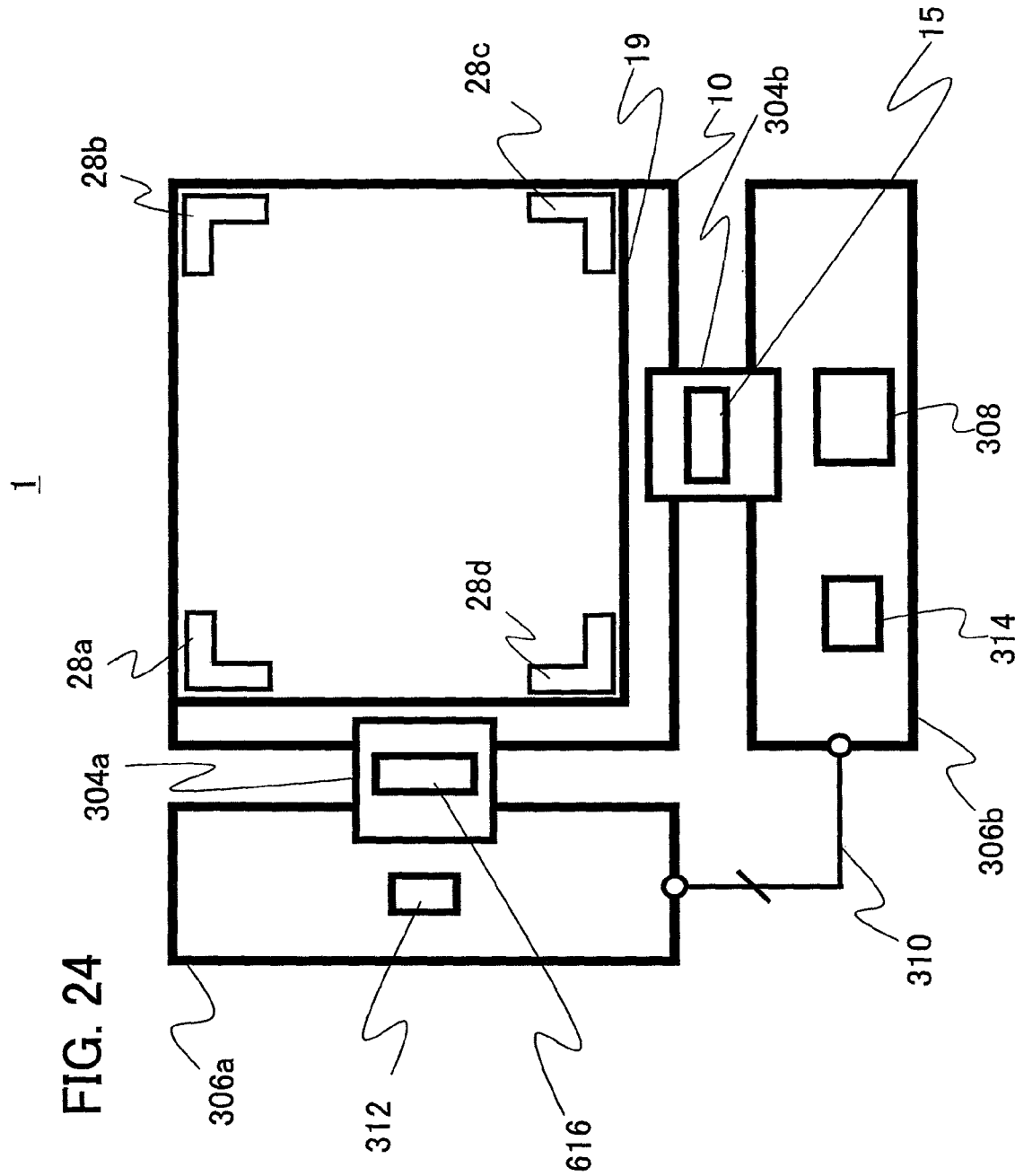
FIG. 24 is a block diagram showing an example formulation of a display according to exemplary embodiment 3 bis of the present invention.

FIG. 24 is a block diagram showing an example formulation of a display according to the exemplary embodiment 3 bis. Referring to FIG. 24, the display 1 includes a substrate A 10, an opposing substrate 19 and an electro-optical material 2, such as liquid crystal, not shown, sandwiched in-between the two substrates.

On the left side of the substrate A 10 is stuck a TAB (Tape Automated Bonding) 304a having mounted thereon a scanning line driving circuit 616. The scanning line driving circuit 616 is formulated as an IC chip. The other end of the TAB 304a is stuck to a first printed circuit board 306a, referred to below as a V-connection board. To the lower side of the substrate A 10 is stuck a TAB 304b having mounted thereon a signal line driving circuit 15. The other end of the TAB 304b is stuck to a second printed circuit board 306b, referred to below as an H-connection board.

On top of the H-connection board 306b is mounted a timing controller 308. This timing controller 308 inputs a display signal, supplied from outside the display 1, and a control signal, inclusive of a timing signal, delivered from outside the display 1, and outputs display data supplied to the signal line driving circuit 15 and a control signal inclusive of a timing signal. The timing controller 308 also outputs a control signal, including a timing signal delivered to the scanning line driving circuit 616.

The display data, supplied to the signal line driving circuit 15, and the control signal, inclusive of the timing signal, are delivered via interconnects on the H-connection board 306b, and via interconnects on the TAB 304b, having mounted thereon the signal line driving circuit 15, to an input terminal of the signal line driving circuit 15. An output signal of the signal line driving circuit 15 is delivered via interconnects on the TAB 304b to a signal line 4, not shown, formed on the substrate A 10.

The control signal, inclusive of the timing signal, delivered to the scanning line driving circuit 616 is delivered to the V-connection board 306a via interconnects on the H-connection board 306b and an FPC (flexible printed circuit board) 310 interconnecting the H-connection board 306b and the V-connection board 306a. The control signal is also delivered to an input terminal of the scanning line driving circuit 616 via interconnects on the V-connection board 306a, a switch device 312 loaded on the V-connection board 306a and interconnects on the TAB 304a. An output signal of the scanning line driving circuit 616 is delivered via interconnects on the TAB 304a to the scanning line 6, not shown, formed on the substrate A 10.

A VCOM driving circuit 314 is provided on the second printed circuit board 306b (FIG. 24). This VCOM driving circuit 314 is a circuit shown in FIG. 4. An output terminal Ne of the VCOM driving circuit 314 is connected via interconnects on the H-connection board 306b and interconnects of the TAB 304b to a storage capacitance line 8, not shown, provided on the substrate A 10. The output terminal Ne of the VCOM driving circuit 314 is connected via interconnects on the H-connection board 306b, FPC 310, interconnects on the V-connection board 306a and interconnects on the TAB 304a to the storage capacitance line 8 formed on the substrate A 10.

The opposing substrate 19 is the same as that described with reference to FIG. 2. The FPC 310, having four electrodes 28a to 28d in the form of an uppercase letter L, is connected to four corners of the electrically conductive film B 14 via an anisotropic conductor. These four electrodes 28a to 28d are connected to the output terminals Na to Nd of the VCOM driving circuit 314.

Figure 25:
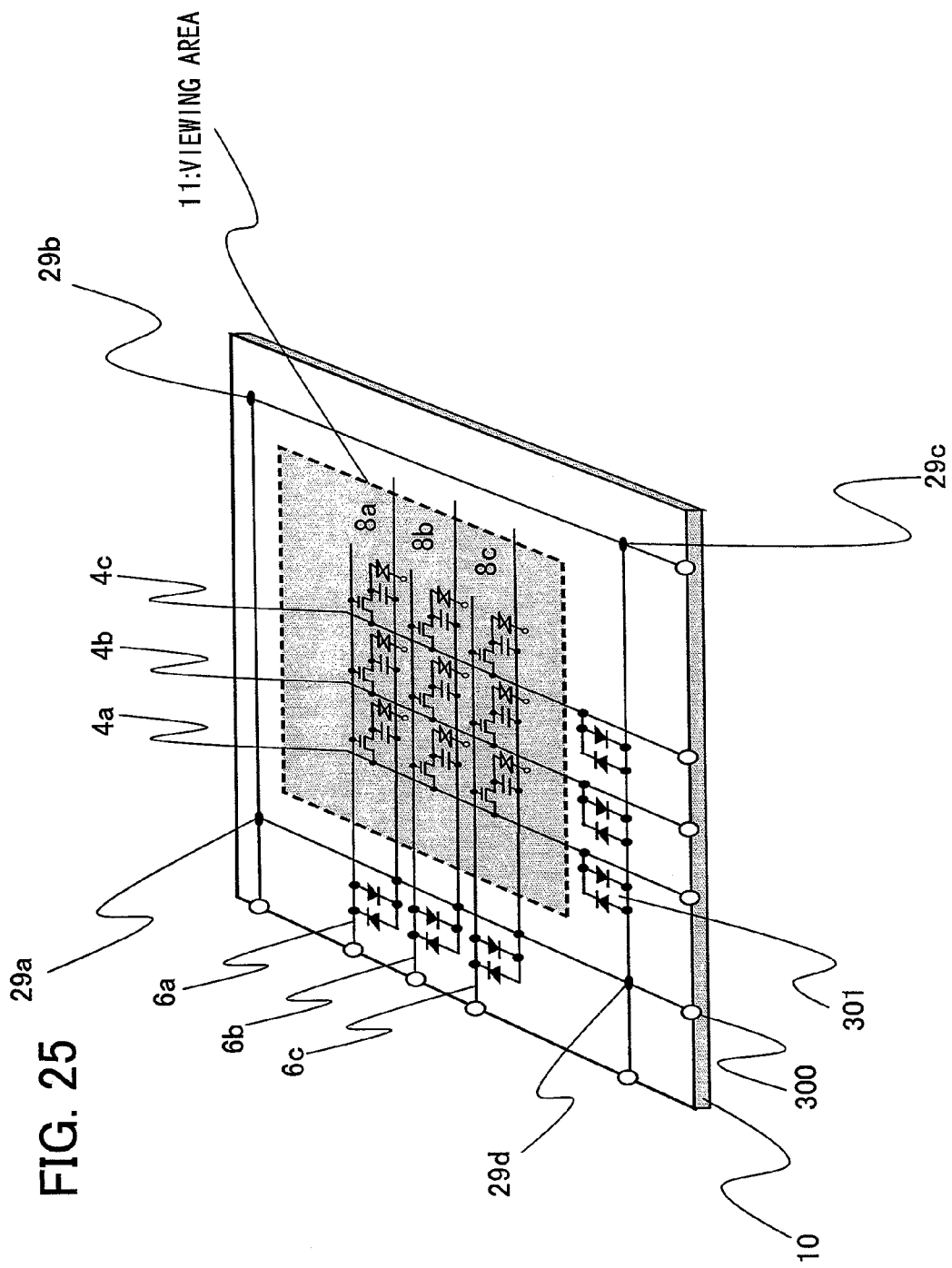
FIG. 25 is a perspective view showing a display substrate of the display according to the exemplary embodiment 3 bis of the present invention.

FIG. 25 depicts a perspective view showing a display substrate 10 of the display 1 according to the present exemplary embodiment. Referring to FIG. 25, the substrate A 10, which is a display substrate, is explained. The present exemplary embodiment differs from the exemplary embodiment 2 shown in FIG. 3 by the absence of the scanning line driving circuit 616 on the substrate A 10, absence of the signal line driving circuit 15, absence of the switches 16, 17, presence of an ESD (ElectroStatic Discharge) protective devices 301 and by the presence of a TAB connection terminal 300.

Only the ESD protective devices 301, connected to the signal line 4a, are indicated as 301, only for simplicity of the drawing. In actuality, the ESD protective devices 301 are provided for the total of the signal lines 4a to 4c and the scanning lines 6a to 6c. Each ES protective device 301 is comprised of an anti-parallel connection of two diode-connected amorphous silicon thin-film transistors, as indicated by circuit symbols shown in FIG. 25. Each ES protective device 301 is connected between the signal line 4 or the scanning line 6 and interconnects connected to the storage capacitance line 8.

Only one TAB connection terminal on the lower side of the substrate A 10 is indicated by a reference numeral 300. However, in actuality, a plurality of the TAB connection terminals are connected to the lower side and on the left side of substrate A 10.

As may be understood from the explanation of FIG. 25, a display substrate, used in a conventional amorphous silicon thin-film transistor, may be used as the substrate A 10 of the present exemplary embodiment.

The manner of routing of interconnects in FIGS. 24 and 25 is now explained in detail.

On the lower side of the substrate A 10, a plurality of the TAB connection terminals 300, associated in a one-for-one relationship with the total of the signal lines (4a to 4c), are provided, and a plurality of the TAB connection terminals 300 are also provided in interconnects connecting to the storage capacitance lines 8a to 8c. A tab 304b is connected to the TAB connection terminal 300 provided on the lower side, and an output signal of the signal line driving circuit 15 is delivered to the TAB connection terminal 300 associated with the signal line 4. A signal of the output terminal Ne of the VCOM driving circuit 314 is delivered via the above-mentioned path to the TAB connection terminal 300 associated with interconnects connecting to the storage capacitance lines 8a to 8c.

On the left side, there are provided TAB connection terminals 300 provided in a one-for-one correspondence to the total of the scanning lines (6a to 6c). The TAB connection terminal 300 is provided for interconnects connecting to the storage capacitance lines 8a to 8c. A TAB 304a is connected to the TAB connection terminal 300 provided on the left side. An output signal of the scanning line driving circuit 616 is delivered to the TAB connection terminal 300 associated with the scanning line 6. A signal of the output terminal Ne of the VCOM driving circuit 314 is delivered via the path set forth above to the TAB connection terminal 300 associated with interconnects connecting to the storage capacitance lines (8a to 8c).

The substrate A 10 and the electrically conductive film A (counter electrode) 12 are electrically connected to each other via an electrode 29 by (1) a silver paste or (2) a sealant admixed with electrically conductive particles.

In the present exemplary embodiment, a general-purpose product, available on the market, may be used as the scanning line driving circuit 616, manufactured as an IC chip, or as the signal line driving circuit 15, also manufactured as an IC chip. On the other hand, according to the present invention, it is necessary to set the signal line or the scanning line in the floating state or to apply a voltage of the same amplitude as that of the electrically conductive film B (electrically conductive position detection film), in order to reduce the parasitic capacitance as seen from the counter electrode during the position detection time interval, as explained in connection with exemplary embodiment 2.

The general-purpose signal line driving circuit has a function of setting the high impedance at the output terminal. This function is utilized. The general-purpose scanning line driving circuit does not have this function. The technique of working out the present invention using the general-purpose scanning line driving circuit is now explained in detail.

FIG. 26 depicts a circuit diagram for explaining the design concept of the V-connection board 306a in the display 1 of the present exemplary embodiment. Referring to FIG. 26, the V-connection board 306a of the present exemplary embodiment is now explained. It is observed that, to assist in understanding of the design concept, FIG. 26 depicts a circuit diagram for illustrating the design concept of the V-connection board 306a, while the elements unneeded for the illustration of the design concept are dispensed with here.

The general-purpose scanning line driving circuit does not have the function of setting the output terminal in the high impedance state, as already indicated. Hence, the scanning line 6 is set in the floating state by setting the scanning line driving circuit 616 in its entirety to the floating state insofar as the dc is concerned.

Referring to FIG. 26, the scanning line driving circuit 616 is connected via a plurality of switch devices 312 to a power supply or to a control signal. The power supply feeds the power to the V-connection board 306a, and is indicated by terminal names of Vgon and Vgoff. The control signal is indicated by a terminal labeled control signal. In FIG. 26, the switch devices 312 are all turned off, representing the state for the position detection time interval. Tracing the dc path of the scanning line 6, the scanning line 6 is connected to a TAB scanning terminal 300a at an end of the substrate A10. The TAB scanning terminal 300a, in turn, is connected to an output terminal of the scanning line driving circuit 616. It is noted that the position detection time interval is set within the vertical blanking time period. Thus, during the position detection time interval, the scanning line driving circuit 616 is set to a state of outputting a voltage delivered to Vgoff which is a voltage of setting the pixel switch TFT off. This voltage is set herein to −8.3V, for example. At this time, the N-channel transistor of the output stage of the scanning line driving circuit 616 is in on-state, whereas the P-channel transistor is in off-state. Hence, the output terminal of the scanning line driving circuit 616 is connected to the power supply terminal Voff of the scanning line driving circuit 616 within the chip insofar as the dc is concerned. The power supply terminal Voff of the scanning line driving circuit 616 is connected to the switch devices 312. During the position detection time interval, the switch devices 312 are controlled to be off, while the scanning line 6 is set to floating state with respect to the power of the power supply delivered to the Vgoff terminal, insofar as the dc is concerned.

On the V-connection board 306a, the capacitor C11 has one end connected to an interconnect connecting to the Voff terminal of the scanning line driving circuit 616, while having its other end connected to an interconnect connecting to the VCOM terminal. An output signal of the output terminal Ne of the VCOM driving circuit 314 is connected to the VCOM terminal.

In the present exemplary embodiment, the output signal of the output terminal Ne during the display driving time period is a dc voltage signal of 4V, as an example, while that during the position detection time interval is a voltage signal corresponding to superposition of an offset voltage 4V and a 2V peak-to-peak sine wave (2Vpp). The signal waveform at this time is shown in the vicinity of the VCOM terminal of FIG. 26.

It is crucial that the opposite end of the capacitor C11 is connected not to the ground but to an interconnect connecting to the VCOM terminal. In this case, the capacitor C11 does not appear as parasitic capacitance when seen from the counter electrode. Additionally, the parasitic capacitance as seen from the counter electrode 12 may be reduced with advantage.

Furthermore, during the off-period of the switch devices 312, the capacitor C11 suppresses dc voltage variations of the scanning line 6 otherwise caused by the leakage currents of the ESD protective devices 301. Should there be no capacitor C11 and should simply the scanning line 6 be set in the floating state, the scanning line 6 is unable to hold the voltage that turns the pixel switch TFT off (the voltage delivered to Vgoff). The leakage current of the pixel switch TFT then increases to deteriorate the picture quality.

The capacitor C14 of FIG. 26 represents the capacitance across the counter electrode 12 and the scanning line 6. The capacitor C13 represents the total of the parasitic capacitance of the scanning line 6 in the display substrate 10 less the capacitance C14 with respect to the counter electrode 12. The terminal of the capacitor C13 not connected to the scanning line 6 is connected to the ground for the ac current. The capacitor C12 represents the parasitic capacitance of interconnects for the V-connection board 306a and the TAB 304a connected from the scanning line 6 insofar as the dc is concerned. The terminal of the capacitor C12 not connected to the scanning line 6 is connected to the ground for the ac current.

The operation as well as the reason the above meritorious effect is derived will now be explained.

The capacitance as seen from the counter electrode 12 is proportionate to the current flowing in the counter electrode 12 by the sinusoidal voltage applied to the counter electrode 12. The above meritorious effect and the operation will now be described by deriving this current based on an equivalent circuit.

Figure 27A:
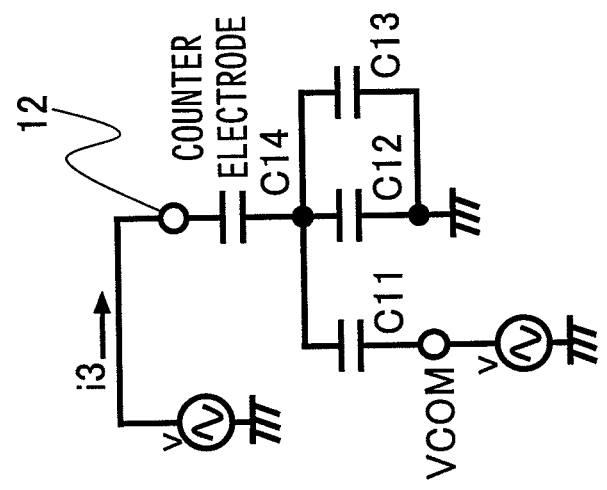
FIGS. 27A, 27B and 27C are an equivalent circuit diagrams for analyzing the operation of the display according to the exemplary embodiment 3 bis of the present invention.
Figure 27B:
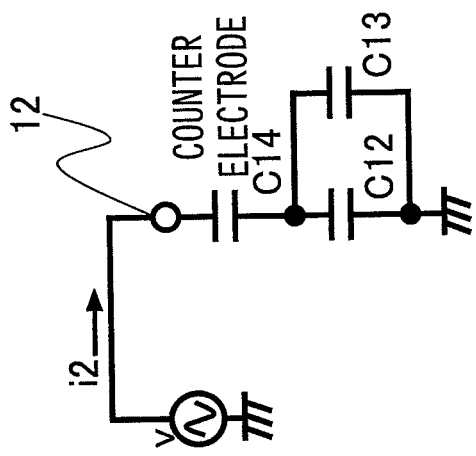
Figure 27C:
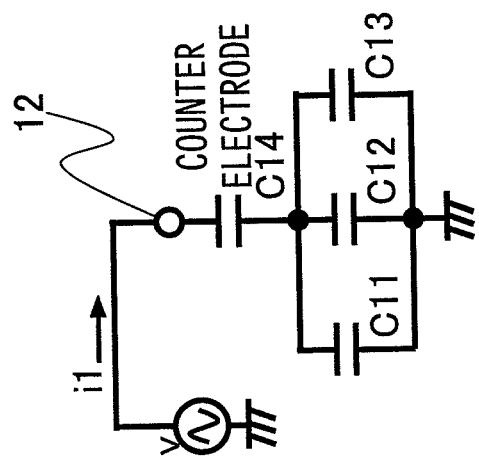

FIGS. 27A, 27B and 27C depict equivalent circuits for analyzing the operation of the display 1 of the present exemplary embodiment. FIG. 27A shows an equivalent circuit of FIG. 26. The elements unneeded for analysis of the operating principle are dispensed with. Two voltage sources of FIG. 27A correspond to an output signal at the output terminal Ne of the VCOM driving circuit 314, and to an ac voltage source that applies the sinusoidal voltage to the counter electrode 12 and the VCOM terminal during the position detection time period. These two voltage sources are ac voltage sources for generating ac voltages of the same amplitude, phase and frequency.

Referring to FIG. 27A, a current i3 flowing through the counter electrode 12 may be calculated as $$i3 = j\omega v \frac{C14(C12 + C13)}{C11 + C12 + C13 + C14} \quad (3)$$

where j denotes an imaginary unit, ω denotes an angular frequency and v denotes a sinusoidal voltage.

On the other hand, an equivalent circuit for a case the capacitor C11 is not provided is shown in FIG. 27B. A current i2 flowing through the counter electrode 12 is given by $$i2 = j\omega v \frac{C14(C12 + C13)}{C12 + C13 + C14} \quad (4)$$

Comparison of the current i3 to the current i2 indicates that, since the capacitances of the capacitors C11 to C14 are of positive values, i2>i3 holds for all time. That is, if the capacitor C11 is arranged between an interconnect connected to a Voff power supply terminal of the scanning line driving circuit 616 and an interconnect connected to the VCOM terminal, the parasitic capacitance as seen from the counter electrode 12 is lower than the case where the capacitor C11 is not so arranged.

The reason the parasitic capacitance as seen from the counter electrode 12 is decreased is as follows: That is, in the absence of the capacitor C11, the current flowing through the counter electrode 12 takes charge of charging/discharging of the capacitors C12, C13. On the other hand, if the capacitor C11 is provided between an interconnect connected to the Voff power supply terminal of the scanning line driving circuit 616 and an interconnect connected to the VCOM terminal, the current flowing through the capacitor C11 also takes charge of charging/discharging of the capacitors C12, C13, as a result of which the current flowing through the counter electrode 12 decreases.

If the static capacitance of the capacitor C11 is 4.7 μF which is sufficiently larger than that of the capacitors C12 to C14, the current i3 can be made significantly smaller than the current i2.

For reference sake, such a case is explained in which the capacitor C11 is arranged between the Voff power supply terminal of the scanning line driving circuit 616 and the ground for the ac current. An equivalent circuit for this case is shown in FIG. 27C, in which a current i1 flowing through the counter electrode i2 is given by $$i1 = j\omega v \frac{C14(C11 + C12 + C13)}{C11 + C12 + C13 + C14} \quad (5)$$

If the capacitor C11 is arranged between the Voff power supply terminal of the scanning line driving circuit 616 and the ground, the capacitor C11 is arranged in parallel with the capacitors C13 and C12, as apparent from FIG. 27C. Thus, in this case, the capacitance as seen from the counter electrode 12 increases in comparison with the case in which the capacitor C11 is not so arranged (FIG. 27B).

If i1−i2 is calculated, we get $$i1 - i2 = j\omega v \frac{C11 \, C14^2}{(C11 + C12 + C13 + C14)(C12 + C13 + C14)} \quad (6)$$

Since the capacitances of the capacitors C11 to C14 are of positive values, i1>i2 holds. Hence, the capacitor C11 should not be arranged between the Voff power supply terminal and the ground for the ac current.

It is seen from above that the capacitor (retention capacitance) C11 of FIG. 26 yields two meritorious effects, that is, suppression of voltage variations due to leakage current during the position detection time period and reduction of the parasitic capacitance as seen from the counter electrode 12.

FIG. 28 depicts a block diagram of the V-connection board 306a in the display 1 of the present exemplary embodiment. The V-connection board 306a of the present exemplary embodiment, implemented on the basis of the above concept, is now described with reference to the block circuit diagram of FIG. 28.

A connector (CN) 311 serves for connection to the TAB 304a having mounted thereon the scanning line driving circuit 616. The signal delivered to the CN 311 may be classified into the following three sorts of signals. These are a signal on a plurality of power supplies of the scanning line driving circuit 616, inclusive of the ground, a signal on a plurality of control signals for the scanning line driving circuit 616 and a signal delivered to the VCOM terminal. In FIG. 28, interconnects for a plurality of power supplies of the scanning line driving circuit 616, inclusive of the ground, are interconnects of the power supply system. Interconnects for a plurality of control signals of the scanning line driving circuit 616 are interconnects of the control signal system, and an interconnect for the signal delivered to the VCOM terminal is VCOM.

The signal supplied to the VCOM terminal is coupled to the substrate A10 via interconnects of the TAB 304a and delivered by the substrate A10 to the storage capacitance line 8 and to the counter electrode 12.

Referring to FIG. 28, the switch device 312 is arranged so that a circuit beyond CN 311 will be set in the floating state, except the interconnect connected to the VCOM terminal, insofar as the dc is concerned. A retention capacitance (A) is arranged between the interconnect connected to the VCOM terminal and each of the power supply interconnects and the ground interconnects in order to retain the power supply voltage with respect to the ground so that the logical states within the scanning line driving circuit 616 will not be varied during the off-time of the switch device 312. It is observed that the capacitor C11, explained with reference to FIG. 26, is included within this retention capacitance (A).

A sample hold circuit (B) 316 is provided for interconnects of a plurality of control signals, as shown in FIG. 28, in a manner distinct from the interconnects of the power supply system. The reason is that, if simply the retention capacitance is added, the logic signal delivered during the display driving time period becomes dull in waveform.

By holding the power supply voltage and the logic state in this manner, the operation of the scanning line driving circuit 616 when next the switch device 312 is turned on is guaranteed.

Meanwhile, the connector (CN) 101 is used for connection to the FPC 310.

Figure 29:
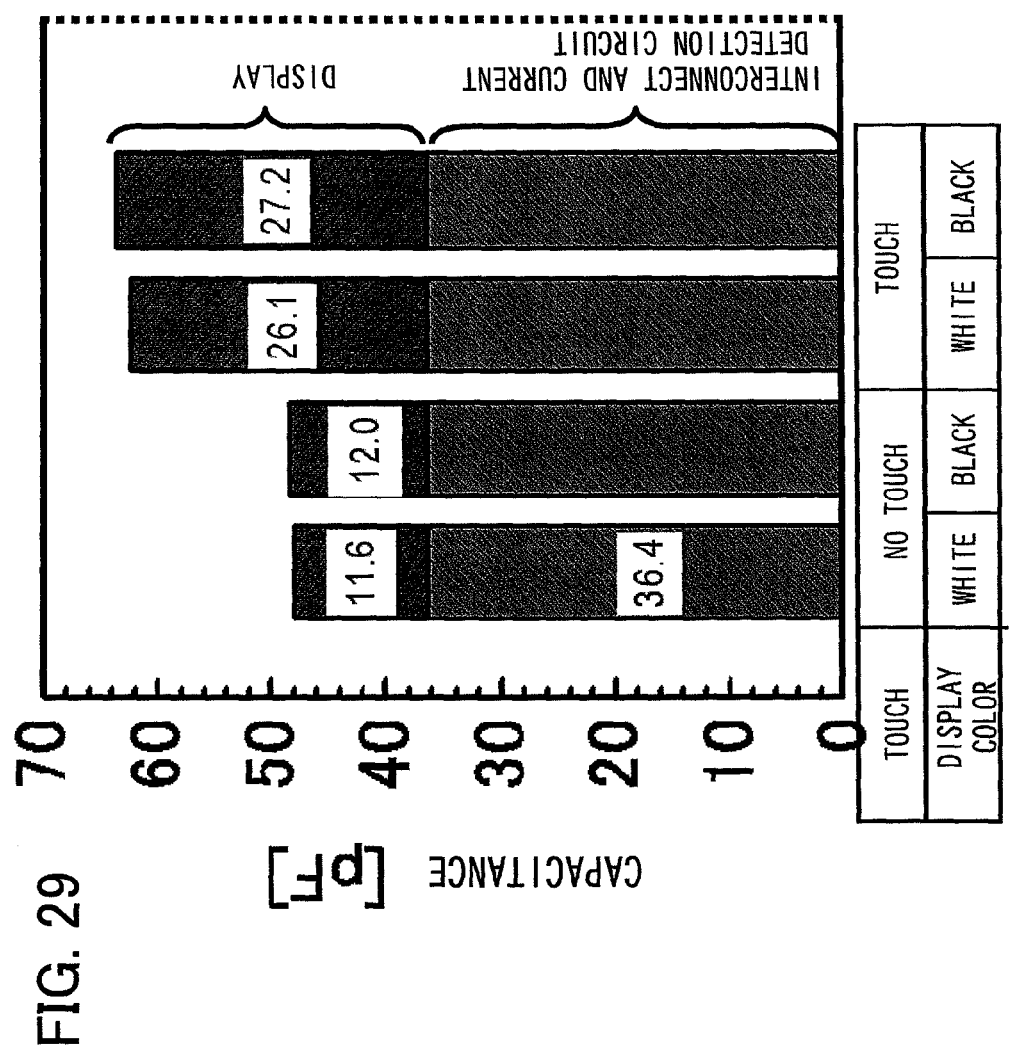
FIG. 29 is a graph for illustrating the experimental result of the display according to the exemplary embodiment 3 bis of the present invention.

FIG. 29 shows results of an experiment by the display 1 of the present exemplary embodiment. Based on the present exemplary embodiment, a liquid crystal display with a diagonal size of 12 inch was prepared. The static capacitance of the electrically conductive position detection film 14 was measured in the same way as for FIG. 10.

The parasitic capacitance, that is, the capacitance in the absence of touch, is ca. 48 pF. Specifically, the capacitance within the display 1 is ca. 12 pF and that outside the display 1, that is, at the parasitic capacitance current detection circuits 13, is ca. 36 pF, with the total of the capacitances being ca, 48 pF. The capacitance of 12 pF, corresponding to the parasitic capacitance in the display 1, is 1/200 of the parasitic capacitance of 2350 pF of the system of the related art, thus demonstrating the meritorious effect in reducing the parasitic capacitance. On the other hand, changes in capacitance dependent on the display color is small enough compared the changes in capacitance dependent on whether or not touch has been made. It has thus been shown that whether or not touch has been made can be detected. Further, a touch input test was conducted using the display prepared based on the present exemplary embodiment. It has been confirmed that the touch input operation is possible and that there is raised no demonstration-related problem.

[Variant of Exemplary Embodiment 3 Bis]

In the above description, an example formulation in which the switch device 312 is connected to the input terminal of the scanning line driving circuit 616 has been described. However, the switch device 312 may also be connected to the input terminal of the signal line driving circuit 15. In this case, the parasitic capacitance of the signal line 4, generated in a manner similar to that generated by the capacitor C13 of FIG. 26, may be reduced by arranging a capacitor in the same way as by arranging the capacitor C11 of FIG. 26, without using the high impedance outputting function of the signal line driving circuit 15.

In the above description, the same voltage is applied to the counter electrode 12 and to the storage capacitance line 8 during the display driving time period. The two voltages may, however, differ from each other. In case the two voltages differ from each other, it is necessary to divide the interconnects in the display substrate 10 so that the counter electrode and the storage capacitance line are not connected common in the display substrate 10. If a separate power supply is provided for applying the voltage to the counter electrode 12 during the display time period, it is sufficient that the counter electrode 12 and the separate power supply are interconnected via a switch device and that the counter electrode 12 and the output terminal Ne of the VCOM driving circuit 314 are interconnected via a capacitor. With this formulation, the voltage of the separately provided power supply may be used as an offset voltage. During the position detection time period, this voltage may be used as an offset voltage, and the voltage of the same amplitude and phase as that of the electrically conductive position detection film 14 may be applied to the counter electrode 12.

The above explanation has been made of the case of utilizing a chip for each of the scanning line driving circuit 616 and the signal line driving circuit 15. However, if these driving circuits are directly fabricated on the substrate A 10 with thin-film transistors, it is possible to connect the switch device 312 to the power supply lines of these driving circuits and to arrange a capacitor similar to the capacitor C11 of FIG. 26.

An advantage of the present exemplary embodiment over the exemplary embodiment 2 is now described. In the exemplary embodiment 2, the scanning line 6 is set in the floating state during the position detection time period. In the present exemplary embodiment, a sinusoidal voltage of the same amplitude, phase and frequency as those of the voltage applied to the electrically conductive film B 14 or the counter electrode 12 is applied via the capacitor C11 to the scanning line 6. Hence, the parasitic capacitance as seen from the counter electrode 12 may be reduced, as set forth with reference to FIG. 27, so that the parasitic capacitance as seen from the electrically conductive film B (electrically conductive position detection film) 14 may be made lesser.

[Meritorious Effects of Exemplary Embodiment 3 Bis]

With the display of the present exemplary embodiment, the first to third meritorious effects, as set forth in connection with the exemplary embodiment 2, may be derived.

Since the generally available (run-of-the-mill) scanning line driving circuit 616 may be used, the present invention may be worked out at a low cost. In addition, since the display substrate, used in a conventional amorphous silicon TFT liquid crystal display, may be used, the present invention may be worked out at a cost reduced further.

Moreover, referring to FIG. 26, since the capacitor C11 is connected between the power supply interconnect of the scanning line driving circuit 616 and interconnect that delivers the voltage to the storage capacitance line 8, it is possible to suppress dc voltage variations on the scanning line 6 otherwise caused by leakage of the ESD protective devices 301. The parasitic capacitance as seen from the counter electrode 12 may also be reduced because the voltage of the same amplitude and phase as those of the voltage applied to the counter electrode 12 may be delivered to the scanning line 6 connected to the scanning line driving circuit 616 via the capacitor C11, as set forth above. Since the voltage is delivered via the capacitor C11, the sinusoidal wave may be superposed on a preset offset voltage on the scanning line 6. Furthermore, a sinusoidal wave may similarly be superposed on a preset offset voltage on the multiple power supplies and the ground connected to the scanning line driving circuit 616. Since the sinusoidal voltage of the same amplitude, phase and frequency may be applied to multiple control signals, multiple power supplies and the ground, connected to the scanning line driving circuit 616, it is possible to maintain the voltage difference across the terminals to prevent malfunctions of the scanning line driving circuit 616. Since the capacitor C11 has the effect of retaining the voltage, it is possible to suppress voltage variations ascribable to the current flowing in the input terminal of the scanning line driving circuit 616.

With the display 1 of the present exemplary embodiment, the first meritorious effect, set forth above, may further be enhanced and the static capacitance of the display substrate 10 as seen from the first electrically conductive film A 12 may appreciably be reduced. The reason this meritorious effect is derived is that the conductors 40, inclusive of the scanning lines 6, and the ac voltage source 22, are connected to each other via a capacitor, and the current flowing through the conductors 40 by the voltage applied via the capacitor charges/discharges the parasitic capacitance of the conductors 40, thus reducing the current needed for the first electrically conductive film A 12 to charge/discharge the parasitic capacitance.

With the display 1 of the present exemplary embodiment, dc voltage variations, otherwise caused by the leakage current flowing through the conductors 40, may be suppressed because the capacitor also has the function of voltage retention.

With the display 1 of the present exemplary embodiment, the multiple conductors 40, such as scanning lines 6, may be set in the floating state, using a pre-existing driving circuit, insofar as the dc is concerned. The reason this meritorious effect is derived is as follows: The power supply input terminal of the driving circuit that drives the conductors 40, for example, the scanning line driving circuit 616, is connected to the power supply circuit that generates a voltage applied to the power supply input terminal of the driving circuit that drives the conductors 40 via a switch device, such as the switch device 312. On the other hand, the power supply input terminal of the driving circuit that drives the conductors 40 is connected to the ac power supply 22 via a capacitor, such as the capacitor C11. Thus, by opening the switch device, the multiple conductors 40 may be set in the floating state insofar as the dc is concerned. In addition, the capacitor holds the voltage of the power supply input terminal of the driving circuit to guarantee the operation of the driving circuit.

Exemplary Embodiment 4

Figure 18:
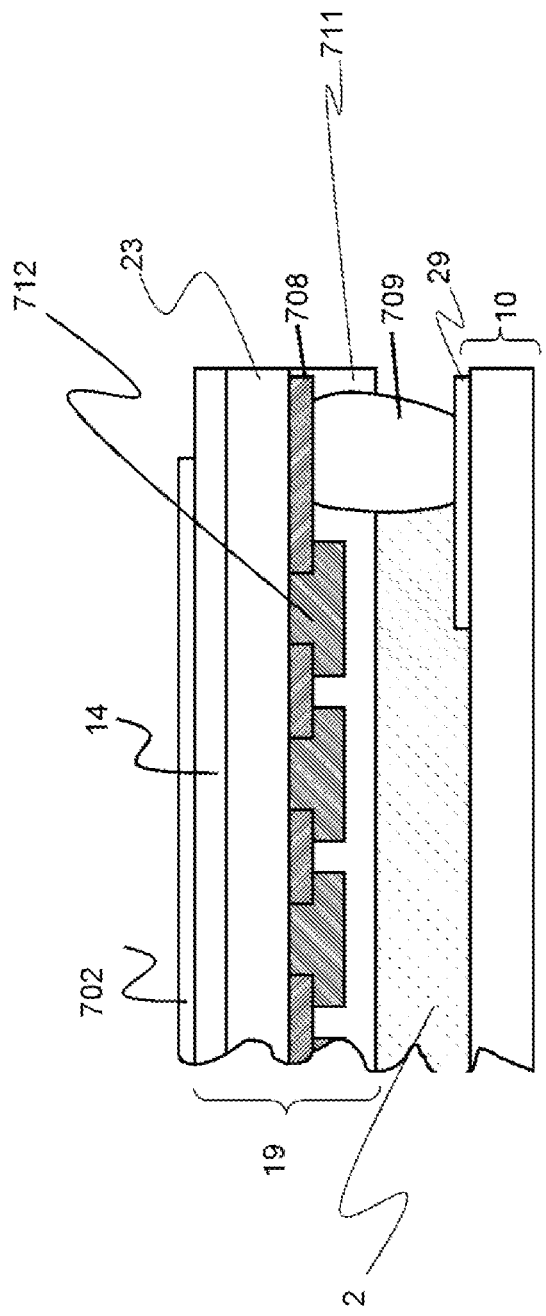
FIG. 18 is a cross-sectional view showing an example display according to exemplary embodiment 4 of the present invention.

A display according to an exemplary embodiment 4 of the present invention is now described with reference to the drawings. FIG. 18 depicts a cross-sectional view showing an example of a display of the present exemplary embodiment. The present exemplary embodiment is directed to a display in which the electrically conductive film A 12 is not needed in the opposing substrate 19.

Referring to FIG. 18, the present display is such a display that uses a liquid crystal mode of the in-plane switching (IPS) system. In exemplary embodiment 2, the electrically conductive film A 12 is provided between the electrically conductive film B 14 and the substrate A 10, and the voltage which is the same as the ac voltage applied to the electrically conductive film B 14 is applied to the electrically conductive film A 12. The conductors formed on the substrate A 10 are set in the floating state, or the ac voltage is applied thereto for reducing the parasitic capacitance of the electrically conductive film B 14. Moreover, in the present exemplary embodiment, the function of the electrically conductive film A 12 is afforded to an electrically conductive light shielding member 708.

The display of the present exemplary embodiment includes a substrate A (display substrate) 10, an opposing substrate 19, and an electro-optical material 2, such as liquid crystal, sandwiched in-between these substrates, and a polarizing plate 702. The opposing substrate 19 includes a substrate B 23, and the light shielding member 708 that is provided on a surface of the substrate B 23 towards the electro-optical material 2 and that is formed to a mesh pattern in association with dots. The opposing substrate 19 also includes a planarizing film 711 formed on a surface of the light shielding member 708 towards the electro-optical material 2 and an electrically conductive film B 14 formed on a surface of the substrate B 23 opposite to the electro-optical material 2. A sealant 709 admixed with electrically conductive particles provides for electrical connection between the light shielding member 708 provided on the opposing substrate 19 and the substrate A 10. The polarizing plate 702 is stuck to the electrically conductive film B 14 with a bond. The substrate A 10 will be explained subsequently.

Figure 19:
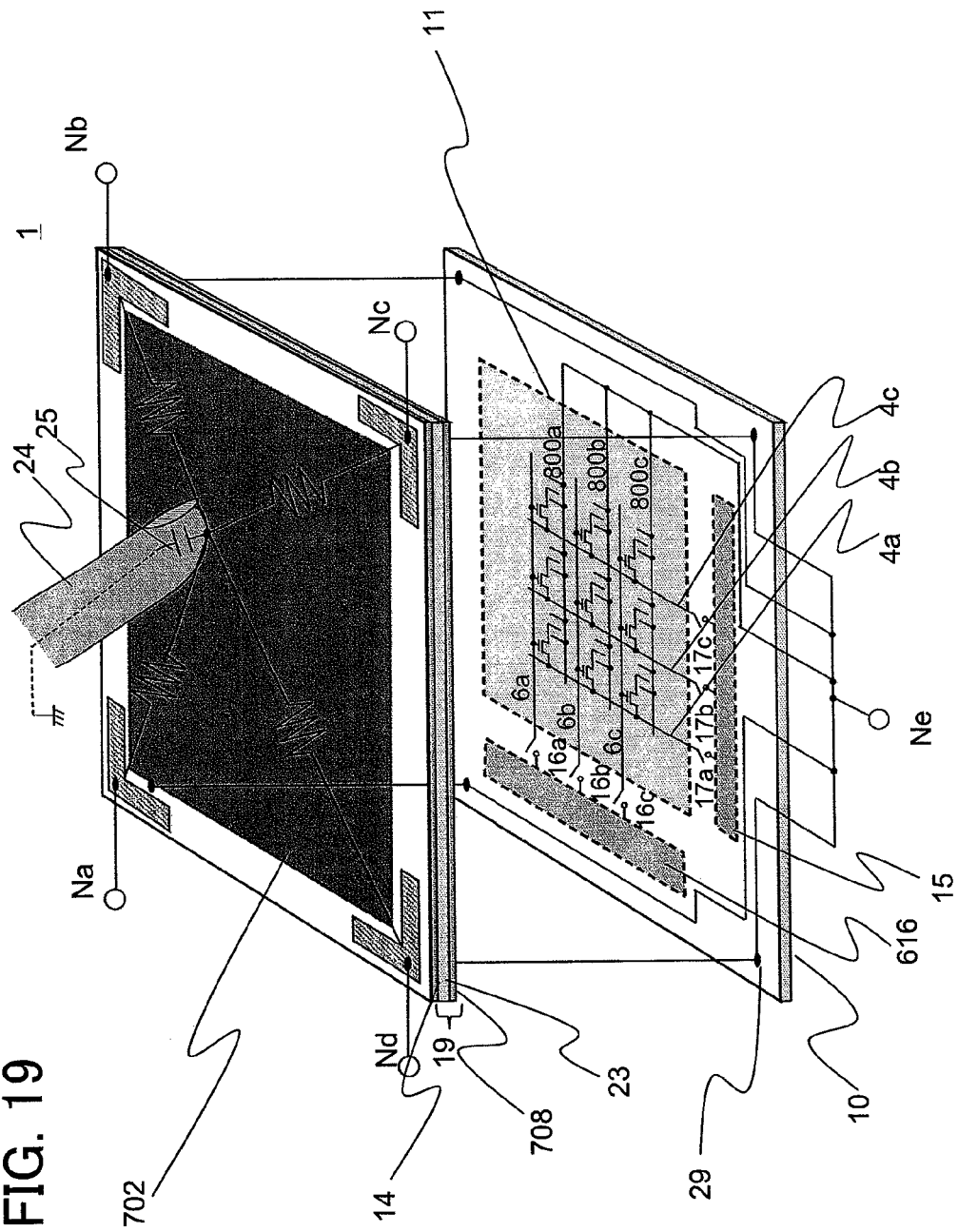
FIG. 19 is a perspective view showing the display according to the exemplary embodiment 4 of the present invention.

FIG. 19 depicts a perspective view of an example of the display according to the present exemplary embodiment. The present exemplary embodiment differs from the exemplary embodiment 2 as to a pixel circuit. The pixel circuit includes a pixel switch TFT, a pixel electrode connected to the switch TFT and a COM electrode. COM interconnects 800a to 800c are connected to the COM electrode and are routed for extending from the inside to the outside of the viewing area. The COM interconnects 800a to 800c are connected to a node Ne shown. The circuit shown in FIG. 4 is connected to the nodes Na to Ne in the same way as in the exemplary embodiment 2.

The light shielding member 708 has a meshed pattern, in register with dots, as explained with reference to FIG. 18. Although the pattern is preferably of a mesh pattern, it may also be striped, for instance. At the end parts of the signal lines 4a to 4c and the scanning lines 6a to 6c, there are provided switches 16a to 16c and switches 17a to 17c, as in the exemplary embodiment 2. The driving method is similar to that for the exemplary embodiment 2.

[Explanation of Meritorious Effects]

By providing the meshed electrically conductive layer, making use of the light shielding member 708, between the electrically conductive film B 14 and the display substrate 10, and by applying the same ac voltage as the voltage applied to the electrically conductive position detection film, to the light shielding member 708, it is possible to reduce the parasitic capacitance of the electrically conductive film B 14. Since the light shielding member 708 operates as a shield, it is possible to eliminate deleterious effects brought about by capacitance changes of the electro-optical material 2 produced on demonstration on the display. By applying the above ac voltage to the interconnects on the substrate A 10 or by setting the conductors on the display substrate to the floating state, the static capacitance as seen from the light shielding member 708 may be reduced. As a result, the time constant of the light shielding member 708 may be reduced. The first and second meritorious effects, set forth above, may be obtained by applying the above ac voltage from the outer rim towards the inner rim of the light shielding member 708. The third meritorious effect may also be derived by the same reason as set forth above.

Since the conductors, arranged on the opposing substrate 19, are connected to the power supply, it becomes possible to prevent the opposing substrate 19 from being electrified. Thus, in a display of the IPS system, it becomes possible to prevent deterioration of the display picture quality so far met by electrification of the opposing substrate 19 due to the absence on the opposing substrate of the electrically conductive layer connected to the power supply.

Exemplary Embodiment 5

Figure 20:
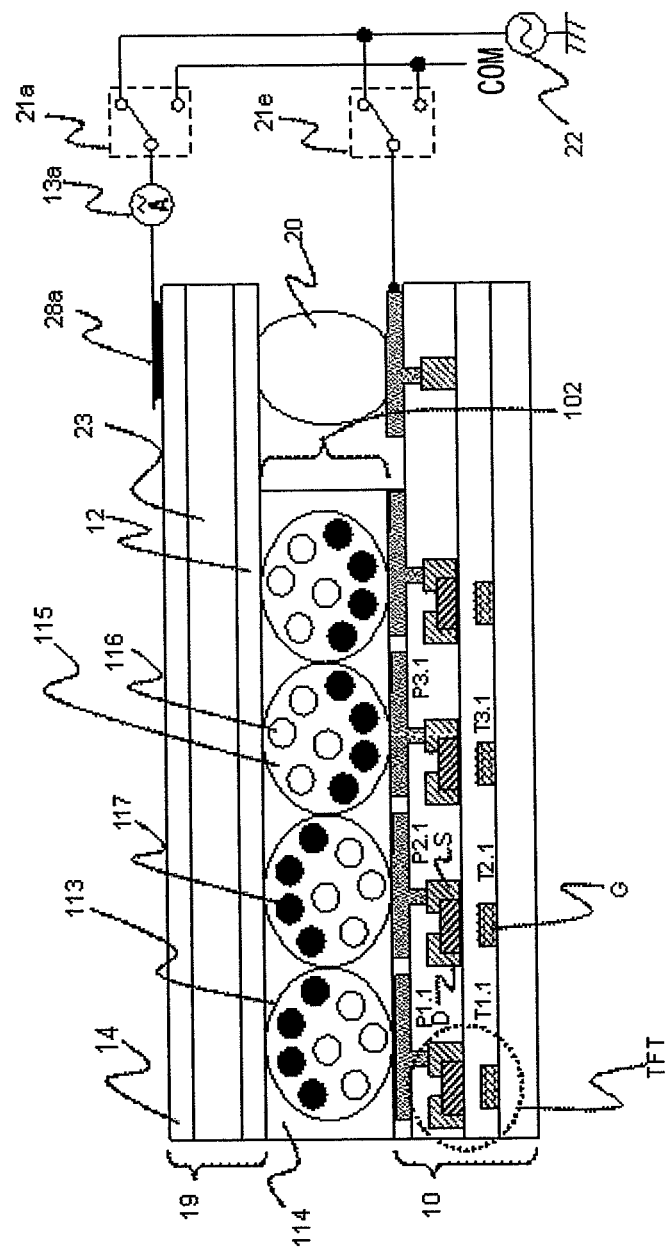
FIG. 20 is a schematic cross-sectional view showing an example display according to exemplary embodiment 5 of the present invention.

A display according to an exemplary embodiment 5 of the present invention is now described with reference to the drawings. FIG. 20 depicts a schematic cross-sectional view showing an example display of the present exemplary embodiment. The present exemplary embodiment is directed to an electrophoretic display (EPD) that makes use of an electrophoretic device. An EPD display, making use of a microcapsule electrophoretic device, is now described with reference to FIG. 20.

FIG. 20 shows a cross-sectional view of a monochromatic EPD active matrix display. The display of the present exemplary embodiment includes an opposing substrate 19, a film-shaped electrophoretic display (EPD film 102), and a display substrate 10. The display substrate 10 is provided with a TFT glass substrate carrying larger numbers of thin-film transistors (TFTs) thereon.

The opposing substrate 19 includes a transparent substrate B 23, on an inner surface of which is formed a transparent electrically conductive film A 12. The transparent substrate B is a substrate formed of plastics, more specifically, polyethylene terephthalate (PET). On an outer surface of the substrate B 23 is formed a transparent electrically conductive film B 14. The substrate B in the opposing substrate 19 may also be a glass substrate instead of being the PET substrate.

The EPD film 102 is in the form of a film in the inside of which there are larger number of micro-capsules 113 and a binder 114 formed of a polymer. The binder fills the space between the micro-capsules and performs the role of binding the micro-capsules 113 together.

In the inside of each micro-capsule 113, about 40 μm in size, e.g., is sealed a solvent 115 of, for example, isopropyl alcohol (IPA). Within the solvent 115, there are dispersed white particles 116 of titanium oxide based white pigments and black particles 117 of carbon based black pigments. The white particles 116 are charged to a minus (−) polarity, whereas the black particles 117 are charged to the plus (+) polarity.

The TFT glass substrate has a four-layered structure. In a first layer, closest to the EPD film 102, there are formed larger numbers of pixel electrodes P1.1, P2.1, P3.1 and so forth. The next second and third layers are formed by insulating films in which there are provided larger numbers of thin-film transistors (TFTs) T1.1, T2.1, T3.1 and so forth associated with pixel electrodes. The drains D and the sources S of the TFTs are provided in the second layer, while the gates G thereof are provided in the third layer. The sources of the respective TFTs are connected to the corresponding pixel electrodes. The fourth layer, as the lowermost layer, is a substrate layer of glass, and performs the role of holding the first to third layers together.

Referring to FIG. 20, a positive (+) voltage is applied from a signal line, not shown, to the pixel electrodes P1.1, P2.1 via corresponding TFT T1.1, T2.1, T3.1 and so forth. This attracts the white particles 116 and the black particles 117 towards the pixel electrodes P1.1, P2.1 and towards the electrically conductive film A 12, respectively. On the other hand, a negative (−) voltage is applied to the pixel electrode P3.1 to attract the black particles 117 and the white particles 116 towards the pixel electrode P3.1 and towards the electrically conductive film A 12, respectively. FIG. 20 shows the manner in which a monochromatic image is displayed in this manner on the opposing substrate 19.

Thus, with an EPD active matrix display, shown in FIG. 20, a monochromatic image may be displayed on the electrically conductive film A 12 depending on selectively applying a positive (+) voltage or a negative (−) voltage to each pixel electrode.

At a corner of a display, a current conduction means 20 for conduction between the opposite substrate 19 and the TFT substrate is provided as a silver paste. The current conduction means 20 provides for electrical connection between an electrically conductive film A 12 provided on one surface of the opposite substrate 19 and an electrode provided on the TFT substrate. A single-pole double-throw switch 21e is connected to a single-pole contact of the electrode on the TFT substrate. An ac voltage source 22 is connected to one of the other two contacts of the single-pole double-throw switch 21e, and a counter electrode driving circuit is connected to the remaining contact. An electrically conductive film B 14 is provided on the opposite surface of the opposite substrate 19, and an electrode 28a is provided at a corner of the electrically conductive film. One end of the current detection circuit 13a is connected to the electrode 28a. The other end of the current detection circuit 13a is connected to a single-pole contact of a single-pole double-throw switch 21a. An ac power supply 22 is connected to one of the other two contacts of the single-pole double-throw switch 21a and a counter electrode driving circuit is connected to the remaining contact.

FIG. 20 shows, for simplicity sake, the manner in which the current detection circuit 13a and the switch 21a are connected at one corner. However, in actuality, the current detection circuit and the switch are provided at each of the four corners as in exemplary embodiment 2. Switches are provided for the signal lines and the scanning lines as in exemplary embodiment 2. Meanwhile, the polarizing plate 702 is unneeded, which is different from exemplary embodiment 2. Thus, on the electrically conductive film B 14 of FIG. 20, there is provided only the electrode 28a on the electrically conductive film B 14. However, an insulating sheet or an insulating coating may be provided as necessary. By providing the insulating sheet or the insulating coating, the electrically conductive film B 14 may be protected against contaminants or moisture to assure a stabilized resistance value of the electrically conductive film B 14. On the other hand, since the dc impedance between the finger and the electrically conductive film B 14 is increased, the current flowing through the current detection circuit 13a is stabilized against changes in states such as finger wetted with water or finger dried. Hence, sensitivity setting of the current detection circuit 13a is facilitated.

The operation of the present exemplary embodiment is similar to that of the exemplary embodiment 2. However, since the EPD has such characteristic that, once the voltage has been written for demonstration, the resulting demonstration may be retained for long. It is thus possible to make the proportion of the position detection time period longer than with the LCD.

If, with the present exemplary embodiment, the substrate A 10 is made thin in thickness, or the pixel circuit is transcribed onto a flexible substrate, it is possible to implement a display which is not only flexible but also is endowed with the touch sense function.

With the display of the present exemplary embodiment, the first and second meritorious effects, set forth above, may be derived, as in the exemplary embodiment 2.

Exemplary Embodiment 6

Figure 21:
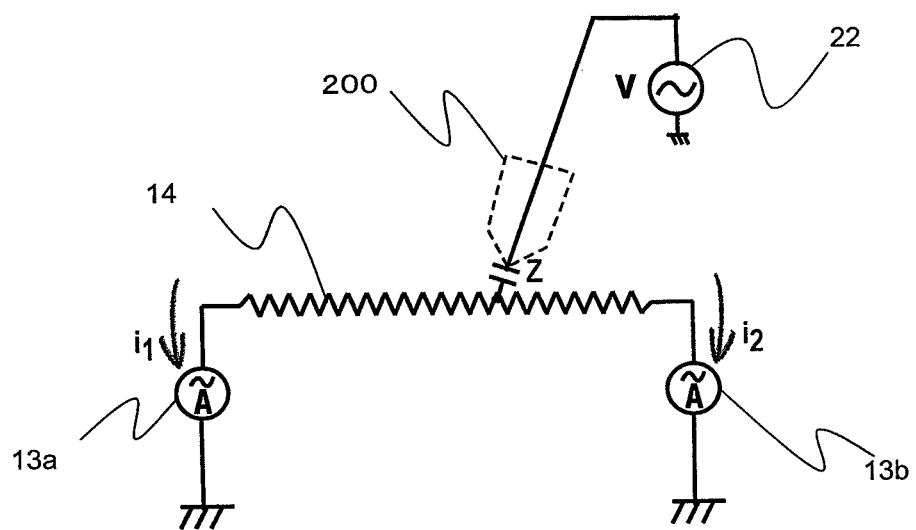
FIG. 21 is a schematic circuit diagram for illustrating the principle of position detection by a display according to exemplary embodiment 6 of the present invention.

An exemplary embodiment 6 of the present invention is now described with reference to the drawings. FIG. 21 depicts a circuit diagram showing an example for showing the principle of position detection by a display of the present exemplary embodiment. In the exemplary embodiments, set forth above, an ac voltage is directly applied to the electrically conductive film B 14. With the present exemplary embodiment, a pen (indicator 200 in FIG. 21) is connected to the ac voltage source 22. The current flowing through an impedance Z is detected by current detection circuits 13a, 13b.

By applying this detection principle to the exemplary embodiments, set forth above, inputting may be made not only by the finger 24, but also by a pen.

Exemplary Embodiment 7

Figure 22:
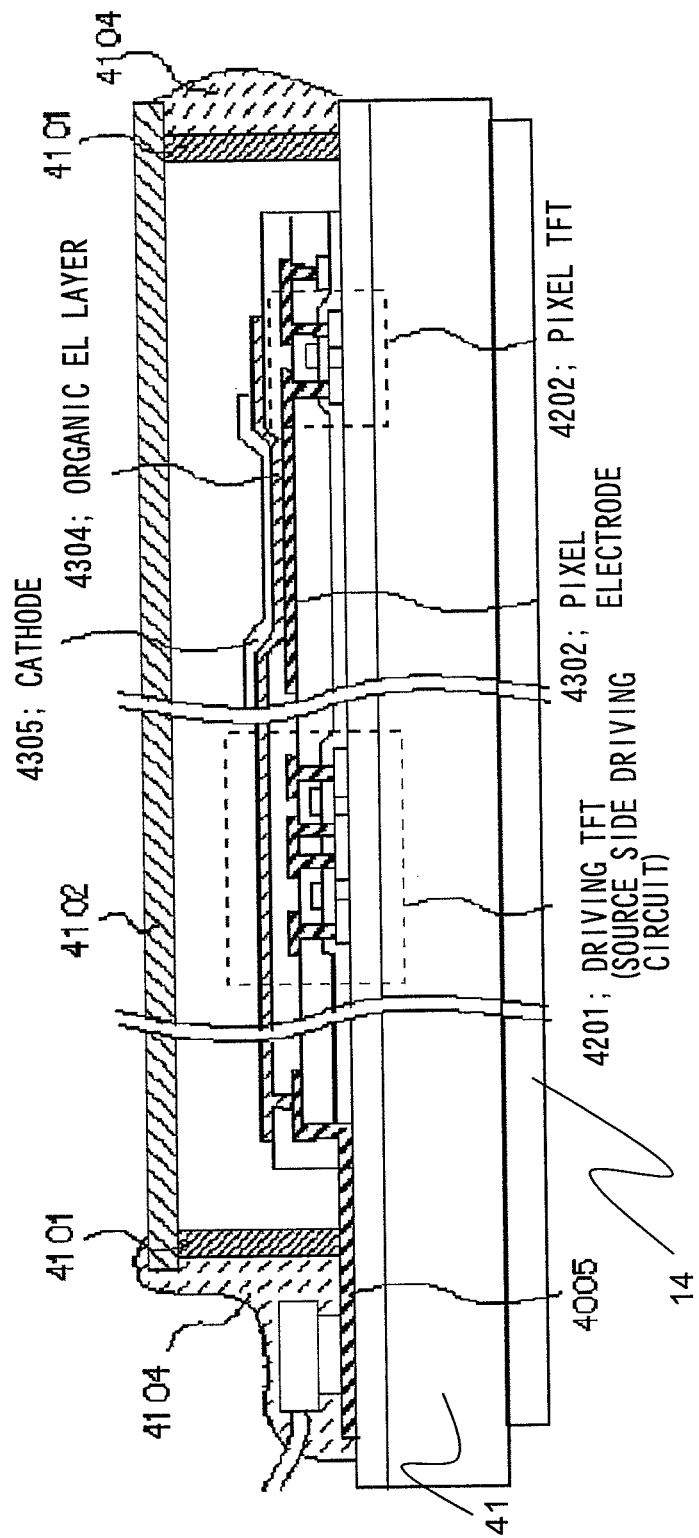
FIG. 22 is a cross-sectional view showing an example display according to exemplary embodiment 7 of the present invention.

An exemplary embodiment 7 of the present invention is now described with reference to the drawings. FIG. 22 depicts a cross-sectional view showing an example of an electroluminescence (EL) display of the present exemplary embodiment. A transparent electrically conductive film, having a large work function, is used as a pixel electrode 4302. An insulating layer, having an opening, is formed on top of a pixel electrode 4302. An organic EL layer 4304 is formed on top of the pixel electrode 4302. As the organic EL layer 4304, any of known suitable organic or inorganic EL materials may be used. On top of the organic EL layer 4304, there is formed a cathode 4305 formed by a light-shielding electrically conductive film. This light-shielding electrically conductive film may, for example, be an electrically conductive film of aluminum, copper or silver, or a multi-layered film of any of these electrically conductive films and other electrically conductive film(s).

In this manner, an EL device, made up of the pixel electrode (anode) 4302, the cathode 4305 and the organic EL layer 4304 is formed. The EL device is covered by a cover material 4102 stuck by a sealant 4101 to a substrate 41.

An electrically conductive film B 14 is formed on the reverse surface of the substrate 41. As in the exemplary embodiment 2, nodes Na to Nd are provided at the four corners. These nodes are connected to respective corresponding circuits.

Figure 23:
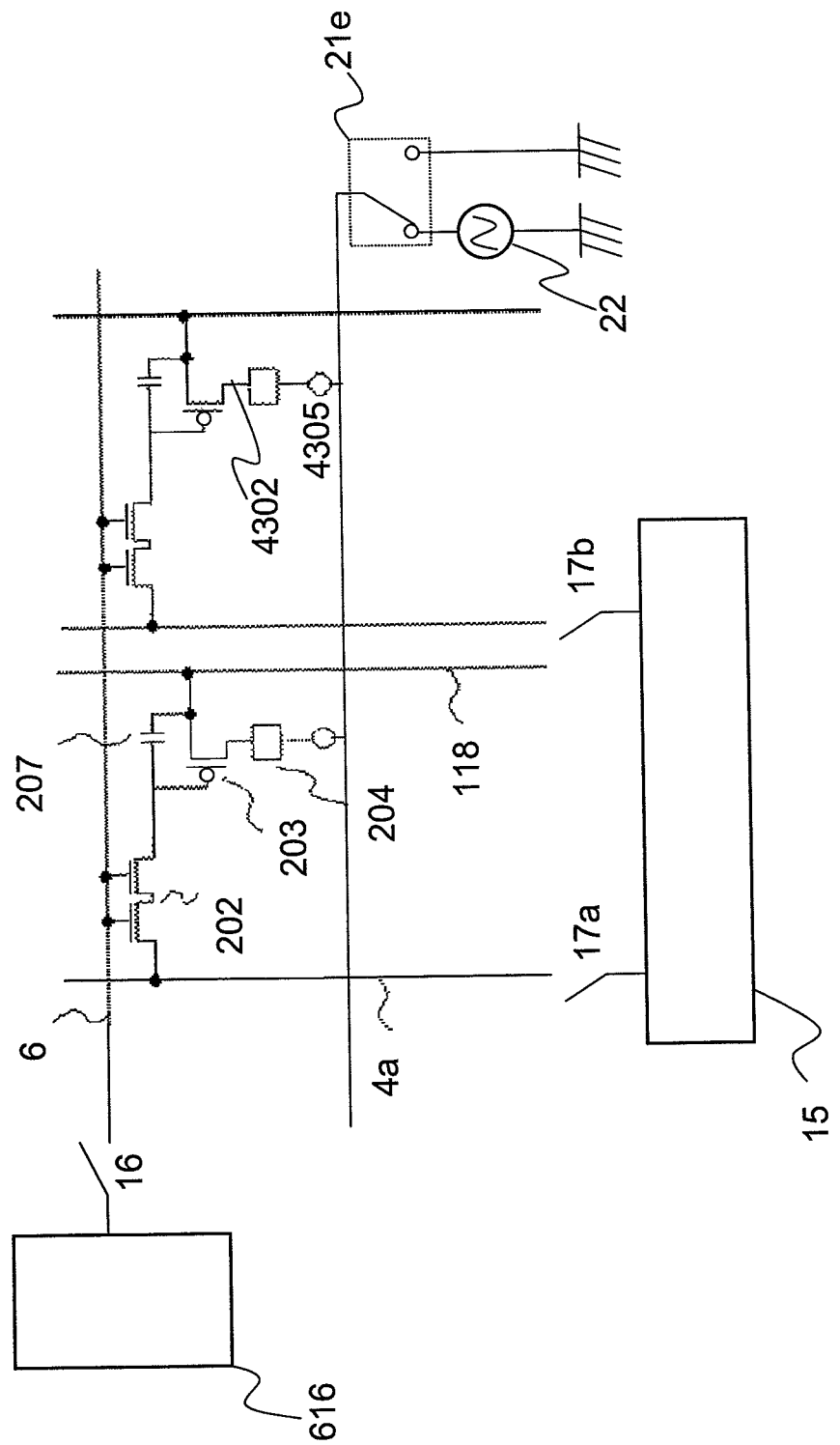
FIG. 23 is a circuit diagram showing the example display according to the exemplary embodiment 7 of the present invention.

FIG. 23 depicts a circuit diagram showing an example of an EL display according to the present exemplary embodiment. A pixel circuit in FIG. 23 is conventional. As in exemplary embodiment 2, a scanning line 6 is connected, via a switch 16, connected at its one end, to the scanning line driving circuit 616. Similarly, a signal line 6 is connected, via switches 17 (17a, 17b) to the signal line driving circuit 15. In the present exemplary embodiment, a cathode line, shared by a plurality of pixels, has one end connected to one of three terminals of a switch 21e. The remaining terminals of the switch 21e are connected to an ac voltage source 22 and to the ground.

The method of driving the display during the position detection time interval is the same as that of the exemplary embodiment 2. The switches 16, 17 are turned off to set the scanning line 6 and the signal line 4a in the floating state. The same voltage as that applied to the electrically conductive film B 14 is applied to the cathode line.

Referring to FIG. 23, the pixel electrode is connected to a control TFT 203 that constitutes a constant current circuit. Since the impedance of an ideal constant current source is infinite, the amplitude of the ac voltage, applied by the ac voltage source 22 to the cathode, directly yields the amplitude of the pixel electrode. At this time, the cathode 4305 and the pixel electrode 4302, shown in FIG. 22, are of the same amplitude as that of the electrically conductive film B 14. Since the scanning line 6 and the signal line 4 are set in the floating state, the parasitic capacitance of the electrically conductive film B 14 may be reduced significantly to advantage.

In the present exemplary embodiment, the switch 17 is provided between the signal line 4 and the signal line driving circuit 15 to set the signal line 4 in the floating state. However, if an output circuit included in the signal line driving circuit constitutes a constant current source, the switch 17 may be dispensed with. The reason is that the impedance of an ideal constant current source is infinite, as set forth above, and hence the state of the signal line 4 is equivalent to the floating state.

The exemplary embodiments 2 to 7 are directed to a liquid crystal display, an electrophoretic display and an EL display. The exemplary embodiments 2 to 7 may, of course, be applied to displays that use other systems, such as systems that make use of charged particles, electrochromic materials, gases, semiconductors or phosphorescent materials.

In the exemplary embodiments 2 to 7, the voltage having the same phase and amplitude as those of the ac voltage applied to the electrically conductive film B 14 has been applied to the electrically conductive film A 12, light shielding member 708, storage capacitance line 8, COM interconnect and to the cathode line. It is however also possible to apply to these components the voltage obtained on adjustment of the phase or the amplitude based on the ac voltage applied to the electrically conductive film B 14. As an example, adjustment of the input voltage waveform to reduce the parasitic capacitance to as small a value as possible is a design matter for those skilled in the relevant technical field.

In the exemplary embodiment 2, such a driving method in which the potential on the electrically conductive film A 12 and on the storage capacitance line will be constant during the display driving time period, as explained with reference to FIG. 8, is used. However, the exemplary embodiments of the present invention are not restricted to this driving method. According to the present invention, driving for position detection is carried out to detect the position during the position detection time period, as set forth above. Hence, the driving method used during the display driving time periods does not affect the precision in position detection. Therefore, any driving methods, so far known in the art, to say nothing of a driving method of reversing the potential (polarity) of the electrically conductive film A 12 and the storage capacitance line every scanning time interval, or a driving method of reversing the potential of the storage capacitance line 8 every frame interval, may be applied during the display driving time period.

EXAMPLES

Figure 14:
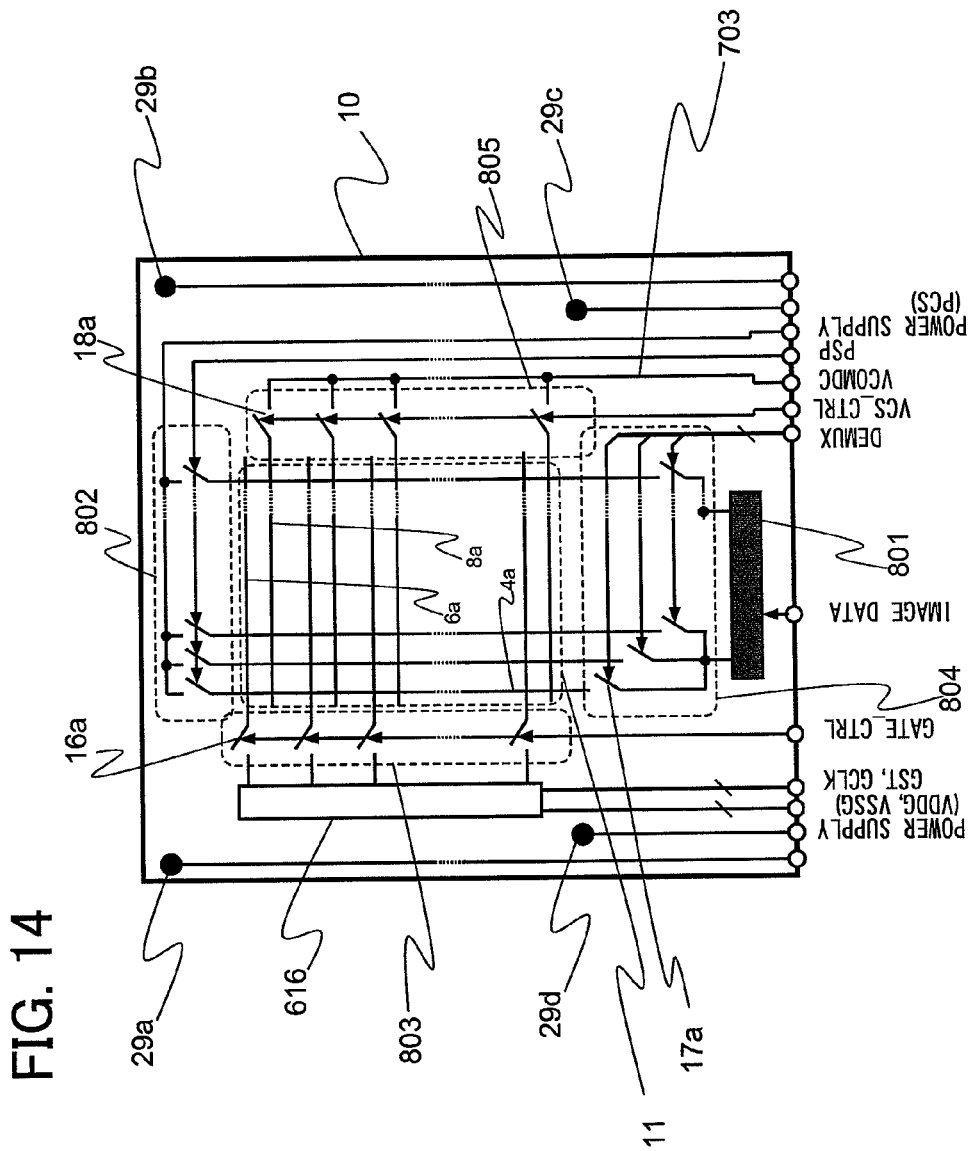
FIG. 14 is a schematic view showing an example layout of a display substrate of a display according to an Example of the present invention.

An Example of the display of the exemplary embodiment 2, shown in FIGS. 2 to 5, is now explained. FIG. 14 depicts an example layout of a substrate A 10 (display substrate) that constitutes a liquid crystal display of Example 1. This substrate A 10 is prepared using a low temperature polysilicon TFT process. Signal lines 4a are routed for extending from the inside towards the outside of the pixel array, and have one ends connected to a demultiplexer circuit 804, while having the other ends connected to a precharge circuit 802. It is observed that, although only one signal line is depicted by the reference numeral 4a in FIG. 14, the total of lines extending vertically within the viewing area 11 represents signal lines.

Scanning lines 6a are routed for extending from the inside towards the outside of the pixel array, and connected to the scanning line driving circuit 616 outside the pixel array via a set of gate line switches 803. It is observed that, although only one scanning line is depicted by the reference numeral 6a in FIG. 14, the total of lines connected to the set of gate line switches 803 represents scanning lines.

Also, storage capacitance lines 8a are routed for extending from the inside towards the outside of the pixel array, and is connected to the storage capacitance bus line 703 outside the pixel array via a set of storage capacitance line switches 805. It is observed that, although only one storage capacitance line is depicted by the reference numeral 8a in FIG. 14, the total of lines connected to the set of storage capacitance line switches 805 represents storage capacitance lines.

An interconnect DEMUX for controlling the demultiplexer circuit 804 is connected to the demultiplexer circuit 804. A power supply line PCS and a control line PSP are connected to the precharge circuit 802. A control line GATE_CTRL is connected to a set of gate line switches, and a control line VCS_CTRL is connected to the set of storage capacitance line switches 805. Power supply lines VDDG, VSSG and a plurality of control lines GST, GCLK are connected to the scanning line driving circuit 616. VCOMDC is connected to the storage capacitance bus line 703. Four electrodes 29 (29a-29d) are provided at the respective corners to set up electrical connection with the opposing substrate 19.

The electro-optical material 2, such as liquid crystal, is sandwiched in-between the substrate A (display substrate) 10 and the opposing substrate 19, shown in FIG. 2, to constitute a display, such as a liquid crystal display. A polarizing plate 702a is stuck to an outer surface of the opposing substrate 19 in the same way as in FIG. 2. A storage capacitance line driving circuit and an ac voltage supply 22 are connected via a switch 21e to VCOMDC and four interconnects connected to the electrodes 29, as shown in FIG. 4.

The control lines and power supply lines, connected to the substrate A 10 from outside the substrate A 10, may be set in the floating states by a switch provided outside the display, not shown. The formulation of the opposing substrate 19 is the same as that shown in FIG. 2, while the circuit connected to the electrically conductive film B 14 is the same as that shown in the exemplary embodiment 2. Hence, the description of these circuits is dispensed with.

The results obtained on actually driving the display, formulated as described above, were measured. For arriving at the meritorious effect of the present invention, the conductor on the substrate A 10 (display substrate) 10 may be set in the floating state, or the ac voltage which is the same as that applied to the electrically conductive film A 12 may be applied to the substrate A 10 to reduce the static capacitance of the substrate A as seen from the electrically conductive film A 12, as set forth above. Here, the meritorious effect derived by setting the conductors in the floating state or at a fixed potential will be described in more detail.

Figure 15:
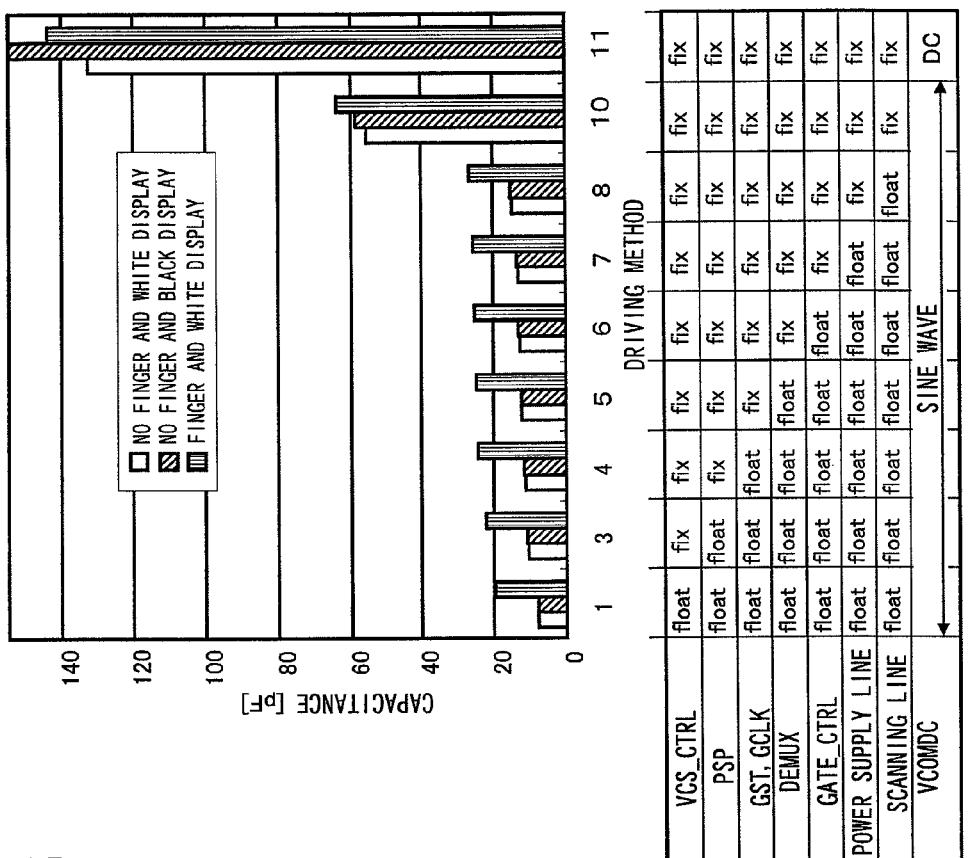
FIG. 15 is a graph showing experimental results with the display according to the Example of the present invention.

FIG. 15 shows the results of measurement of the static capacitance using the display of the present Example. With the white color demonstrated on the entire display surface, measurements were made of the static capacitance in case a finger touch was made and that in case the finger touch was not made, as described above with reference to FIG. 10. In addition to the parasitic capacitance in case of displaying the white color on the entire substrate surface, the parasitic capacitance in case of displaying the black color on the entire substrate surface was measured.

The abscissa of the graph, more specifically, the symbols from 1 to 11, with the omission of 2 and 9, denote the states of interconnects on the substrate A 10. The states of the respective interconnects are indicated in the Table. The leftmost column of the Table stands for the interconnects of FIG. 14.

In the Table, 'float' indicates that an interconnect of interest is floating during the position detection time period, and 'fix' indicates that the interconnect is connected to a fixed potential. In the row of the storage capacitance line VCOMDC, 'SINE WAVE' denotes that an ac voltage has been applied to the electrically conductive film B 14 and to the electrically conductive film A 12, and 'DC' denotes that the dc voltage has been applied, as in the conventional LCD.

It is noted that the states of the signal lines are all 'float'. This state may be set by turning off the total of the switches provided on the substrate A 10 in the demultiplexer circuit. In the present experiment, the switches of the set of storage capacitance line switches 805 were always turned on so that the total of the storage capacitance lines would be in the states shown in the Table.

The results obtained with the display of the present Example are explained with reference to FIG. 15. If attention is focused on the symbol 11 of FIG. 15, the states for this symbol represent the case of 'fix' for all interconnects shown in FIG. 15. For storage capacitance lines, the dc voltage is applied. In this case, the second meritorious effect, set forth above, may not be obtained. That is, changes in static capacitance resulting from changes in display contents are larger than changes in static capacitance brought about by whether or not touch has been made. Data for the symbol 10 are for a case where, under this state, the sine wave is applied to the storage capacitance line. As may be seen from the graph, the second meritorious effect, set forth above, is obtained for data of symbols 1 to 10. That is, since the changes in static capacitance brought about by whether or not touch has been made are greater than the changes in static capacitance resulting from changes in display contents, whether or not touch has been made (i.e., touching) may be detected accurately. Thus, to get the second meritorious effect, it is at least necessary to apply the sine wave to the storage capacitance line. Moreover, the parasitic capacitance decreases in a direction from the symbol 10 to the symbol 1. This indicates that it is effective that as many conductors on the substrate A 10 as possible are set in the floating state. This is in agreement with the fact that it is crucial to reduce the static capacitance of the substrate A 10 as seen from the electrically conductive film A 12, as set forth above.

Further, setting the interconnects only on the outer side of the viewing area 11 in the floating state contributes to reducing the parasitic capacitance. For example, comparison of the data for the symbol 4 and that for the symbol 3 indicates that setting the control line PSP in the floating state reduces the parasitic capacitance, even though the line PSP is arranged outside the viewing area 11. The reason is that, although the majority of the static capacitance of the substrate A 10 as seen from the electrically conductive film A 12 is formed in the inside of the viewing area 11, part of it is contribution from the static capacitance formed on the outer side of the viewing area.

Here, description has been made of the case of applying the sinusoidal wave to reduce the static capacitance of the storage capacitance line as seen from the electrically conductive film A 12. However, a comparable meritorious effect has been derived for the case of setting the storage capacitance line in the floating state.

The present Example is directed to the case in which the precharge circuit 802 is connected to the signal line. However, the precharge circuit 802 is not essential and the other end of the signal line may also be connected to the precharge circuit 802.

In the present Example, n-type TFTs are used as switches 16 to 18 that set the inner part and the outer part of the viewing area 11 to a high impedance state. These switches may also be p-type TFTs or transfer gates made up of the n-type TFTs and p-type TFTs. Also, in the present Example, the driving circuit is formed by n-type TFTs and p-type TFTs. However, the driving circuit may also be formed by one type TFTs only, that is, only p-type TFTs or n-type TFTs.

Since the switch selection may be widely variable, the switches may be provided without increasing production costs in working out the present invention. For example, if the signal line driving circuit or the scanning line driving circuit is constructed using n-type and p-type polysilicon TFTs, n-type switches, p-type switches or the combinations of the n-type and p-type switches may be selectively used to provide the switches without increasing the production process steps. If the n-type or p-type switches are selected, the circuit area may be lesser than if the transfer gates are used, thus simplifying the control. Since the parasitic capacitance at the switch off time may be suppressed to lower values, deterioration in the SN ratio of a signal indicating a position pointing motion or indicating whether or not touch has been made may be suppressed with advantage. In particular, the on-resistance is lower for the n-type switch than for the p-type switch, so that the switch size may further be reduced to suppress the parasitic capacitance to a further lower value.

Form the perspective of suppressing the driving voltage, transfer gates are preferred. If, in the display, the circuit exclusive of a switch that sets the inner part of the display and the part outside the display in the high impedance state is formed by only one of the n-type transistors or the p-type transistors, the switches may be correspondingly formulated by only one type transistors. This enables switches to be provided without increasing the number of the manufacture process steps.

Although the switches 16 are provided outside the scanning line driving circuit 616, these switches may also be provided within the inside of the scanning line driving circuit 616. In case the switches are provided within the scanning line driving circuit 616, a circuit configuration capable of outputting three values, namely a high level, a low level and high impedance, may be used. In this case, a clocked inverter circuit, for example, may be used. Control may be exercised to set the transistor on an output stage of the driving circuit in a high impedance state, with the transistor on the output stage then operating simultaneously as a switch, thereby suppressing the circuit area.

In the present Example, there is the electrically conductive film A 12 at a position facing the scanning line driving circuit 616. However, from the perspective of reducing the parasitic capacitance of the transparent electrically conductive film, the area taken up by the electrically conductive film A 12 is preferably of a necessary minimum value. Hence, the portion of the electrically conductive film A 12 facing the scanning line driving circuit 616 may be eliminated.

In the present Example, the electrically conductive film B 14, formed of ITO, is used as an impedance plane, and the impedance of an equivalent circuit thereof is presupposed to be a resistor. It is however possible to take into account the impedance inclusive of the resistance, capacitance and the inductance, depending on the frequency of the ac current delivered to the impedance plane, and to solve the equivalent circuit, in order to find an equation for use in detecting the relationship between the current value and the coordinates of the touch position or whether or not touch has been made.

In the present Example, a resistor formed to a planar shape is used as an impedance plane. Alternatively, an inductor or a capacitor formed to a planar shape may be used. Meanwhile, the impedance plane is a generic appellation of an impedance entity formed to a planar shape.

Although the foregoing description has been made with reference to the exemplary modes, exemplary embodiments and Examples, the present invention is not to be limited to those.

INDUSTRIAL UTILIZABILITY

The display of the present invention may be utilized in game machines, mobile information terminals, ticket vending machines, automatic telling machines (ATM), car navigation systems, TV game machines mounted on passenger seats of airplanes or buses, factory automation (FA) machines, printers or facsimiles.

In the present invention, further aspects and modes are included as follows.

In a fourth aspect, there is provided a display comprising:

an electro-optical material arranged between first and second planes facing each other;

a first substrate arranged on said first plane and including a conductor that affords an electrical signal to said electro-optical material;

a first electrically conductive film arranged on said second plane to afford an electrical signal to said electro-optical material;

a second electrically conductive film arranged outside an area sandwiched between said first and second planes;

a current detection circuit that detects the current on said second electrically conductive film; and a control circuit that, during a time period the current is detected by said current detection circuit, applies a voltage which is substantially the same in amplitude and phase as that applied to said second electrically conductive film, to one of said conductor and said first electrically conductive film which is arranged more proximate to said second electrically conductive film, and that sets the other in a floating state, or that applies said voltage to said conductor and to said first electrically conductive film.

As a 9th exemplary mode, the display according to the fourth aspect may further comprise:

an ac voltage source that applies ac voltage to said second electrically conductive film;

said current detection circuit detecting the current between said ac voltage source and said second electrically conductive film.

As a 10th exemplary mode, in the display according to the 9th exemplary mode, said conductor may be connected to a second voltage source via a switch device; and wherein said conductor may be connected to said ac voltage source via a capacitor.

As an 11th exemplary mode, in the display according to the 9th exemplary mode, said first electrically conductive film may be connected to a third voltage source via a switch device; and wherein said first electrically conductive film may be connected to said ac voltage source via a capacitor.

As a 12th exemplary mode, in the display according to the 9th exemplary mode may further comprise:

a driving circuit that drives said conductor;

a power supply input terminal of said driving circuit; and a power supply circuit that generates a voltage to be afforded to said power supply input terminal;

said power supply input terminal being connected to said power supply circuit via a switch device;

said power supply input terminal being connected to said ac voltage source via a capacitor.

As a 13th exemplary mode, in the display according to the 9th exemplary mode, said electro-optical material may be composed mainly of liquid crystal;

said first electrically conductive film may be transparent;

said second electrically conductive film may be transparent and arranged on the same side of an area delimited by said first and second planes as said first electrically conductive film; and wherein said display may further comprise a second substrate sandwiched between said first and second electrically conductive films; wherein during the time period said current detection circuit may detect the current, said control circuit may set a part of said conductor extending from inside to outside of a viewing area to a floating state and applies a voltage substantially the same in amplitude and phase as that applied to said second electrically conductive film to said first electrically conductive film, or may apply said voltage to said part of said conductor extending from inside to outside of said viewing area and to said first electrically conductive film.

As a 14th exemplary mode, in the 13th exemplary mode, said conductor may include a storage capacitance line extending from inside to outside of the viewing area; and wherein during the time period said current detection circuit may detect the current, said control circuit may set said storage capacitance line to a floating state and applies a voltage which is substantially the same in amplitude and phase as that applied to said second electrically conductive film to said first electrically conductive film, or may apply said voltage to said storage capacitance line and to said first electrically conductive film.

As a 15th exemplary mode, in the 13th exemplary mode, said conductor may include a scanning line extending from inside to outside of said viewing area; and wherein said scanning line may be connected via a switch device to a scanning line driving circuit that drives said scanning line, or said scanning line driving circuit outputs three values of a high level, a low level and a high impedance and may be directly connected to said scanning line.

As a 16th exemplary mode, in the display according to the 15th exemplary mode may further comprise:

a scanning line driving circuit that drives said scanning line;

a power supply input terminal of said scanning line driving circuit; and a power supply circuit that generates a voltage to be afforded to said power supply input terminal;

said power supply input terminal being connected to said power supply circuit via a switch device;

said power supply input terminal of said scanning line driving circuit being connected to said ac voltage source via a capacitor.

As a fifth aspect, there in provided an electronic apparatus including the display according to the fourth aspect and the 9th to 16th exemplary modes.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A display, comprising:
an electro-optical material arranged between first and second planes facing each other;
a first substrate arranged on the first plane and including a conductor that affords an electrical signal to the electro-optical material;
a second substrate arranged on the second plane and including a first electrically conductive film that affords an electrical signal to the electro-optical material;
a second electrically conductive film arranged outside an area sandwiched between a plane of the first substrate, on which the electro-optical material is not arranged, and a plane of the second substrate, on which the electro-optical material is not arranged;
a current detection circuit that detects a current on the second electrically conductive film;
a control circuit that, during a time period the current is detected by the current detection circuit, applies a voltage with substantially the same amplitude and phase as that applied to the second electrically conductive film to one of the conductor extending from inside to outside of a viewing area and the first electrically conductive film, and sets the other in a floating state, or applies a voltage with substantially the same amplitude and phase as that applied to the second electrically conductive film to both the conductor extending from inside to outside of a viewing area and the first electrically conductive film; and
a detecting unit that detects, based on the current detected by the current detection circuit, whether or not touch has been made by a finger or a pointer and where the touch has been made.

2. A display, comprising:
an electro-optical material sandwiched between a first substrate and a second substrate;
a conductor that is arranged on the first substrate, extends from inside to outside of a viewing area, and affords an electrical signal to the electro-optical material;
a first electrically conductive film that is arranged on the second substrate and affords an electrical signal to the electro-optical material;
a second electrically conductive film arranged outside an area sandwiched between a plane of the first substrate, on which the electro-optical material is not arranged, and a plane of the second substrate, on which the electro-optical material is not arranged;
a current detection circuit that detects a current on the second electrically conductive film;
a control circuit that, during a time period the current is detected by the current detection circuit, applies a voltage with substantially the same amplitude and phase as that applied to the second electrically conductive film to one of the conductor and the first electrically conductive film, and sets the other in a floating state, or applies a voltage with substantially the same amplitude and phase as that applied to the second electrically conductive film to both the conductor and the first electrically conductive film; and a detecting unit that detects, based on the current detected by the current detection circuit, whether or not touch has been made by a finger or a pointer and where the touch has been made.

3. An electronic apparatus, comprising the display according to claim 1.

4. An electronic apparatus, comprising the display according to claim 2.

* * * * *